(12) United States Patent
Reed et al.

(10) Patent No.: US 6,900,440 B2
(45) Date of Patent: May 31, 2005

(54) HIGH SENSITIVITY INFRARED SENSING APPARATUS AND RELATED METHOD THEREOF

(75) Inventors: Michael L. Reed, Charlottesville, VA (US); Travis N. Blalock, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 0 days.

(21) Appl. No.: 10/204,676

(22) PCT Filed: Feb. 26, 2001

(86) PCT No.: PCT/US01/06099
§ 371 (c)(1),
(2), (4) Date: Nov. 15, 2002

(87) PCT Pub. No.: WO01/63232
PCT Pub. Date: Aug. 30, 2001

(65) Prior Publication Data
US 2003/0141453 A1 Jul. 31, 2003

Related U.S. Application Data

(60) Provisional application No. 60/184,553, filed on Feb. 24, 2000.

(51) Int. Cl.⁷ .................................................. G01J 5/06
(52) U.S. Cl. .................................... 250/338.1; 250/332
(58) Field of Search ........................... 250/338.1, 332, 250/338.4, 338.5, 339.02, 343, 352, 370.01, 370.08, 495.1; 338/18; 438/53, 113

(56) References Cited

U.S. PATENT DOCUMENTS

| | | | | |
|---|---|---|---|---|
| 5,340,984 A | * | 8/1994 | Evans ........................ | 250/332 |
| 5,367,167 A | * | 11/1994 | Keenan .................... | 250/338.4 |
| 5,627,112 A | * | 5/1997 | Tennant et al. ............. | 438/113 |
| 5,760,398 A | * | 6/1998 | Blackwell et al. .......... | 250/332 |
| 5,912,464 A | * | 6/1999 | Vilain et al. .............. | 250/338.4 |
| 6,329,655 B1 | * | 12/2001 | Jack et al. ................ | 250/338.1 |
| 6,576,904 B1 | * | 6/2003 | Volkening ................ | 250/338.2 |

* cited by examiner

*Primary Examiner*—Otilia Gabor
(74) *Attorney, Agent, or Firm*—Robert J. Decker

(57) ABSTRACT

The infrared (IR) sensing apparatus (101) and related method achieves improvement over traditional infrared sensors by levitating or suspending the IR platform (103) to reduce the loss of IR energy, which normally dissipates in the form of heat. The levitating IR sensitive platform (123) of the present invention has no contact with the substrate (110) during energy absorption, thus eliminating a substantial disadvantage existing in the conventional systems proposed heretofore.

41 Claims, 15 Drawing Sheets

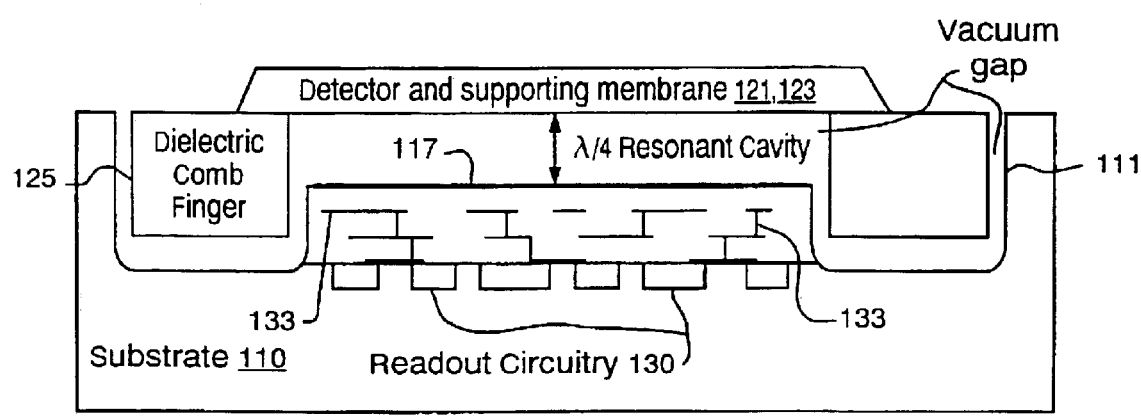
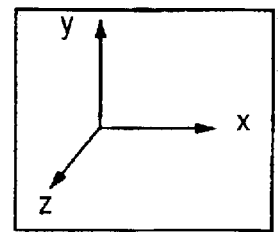
FIG. 9

Calibration

Regular Usage

TRENCHED SUBSTRATE

APPLY EPOXY RESIN

MATE WITH PLANAR
SUBSTRATE; CURE RESIN

RELEASE PLANARIZING
SUPERSTRATE

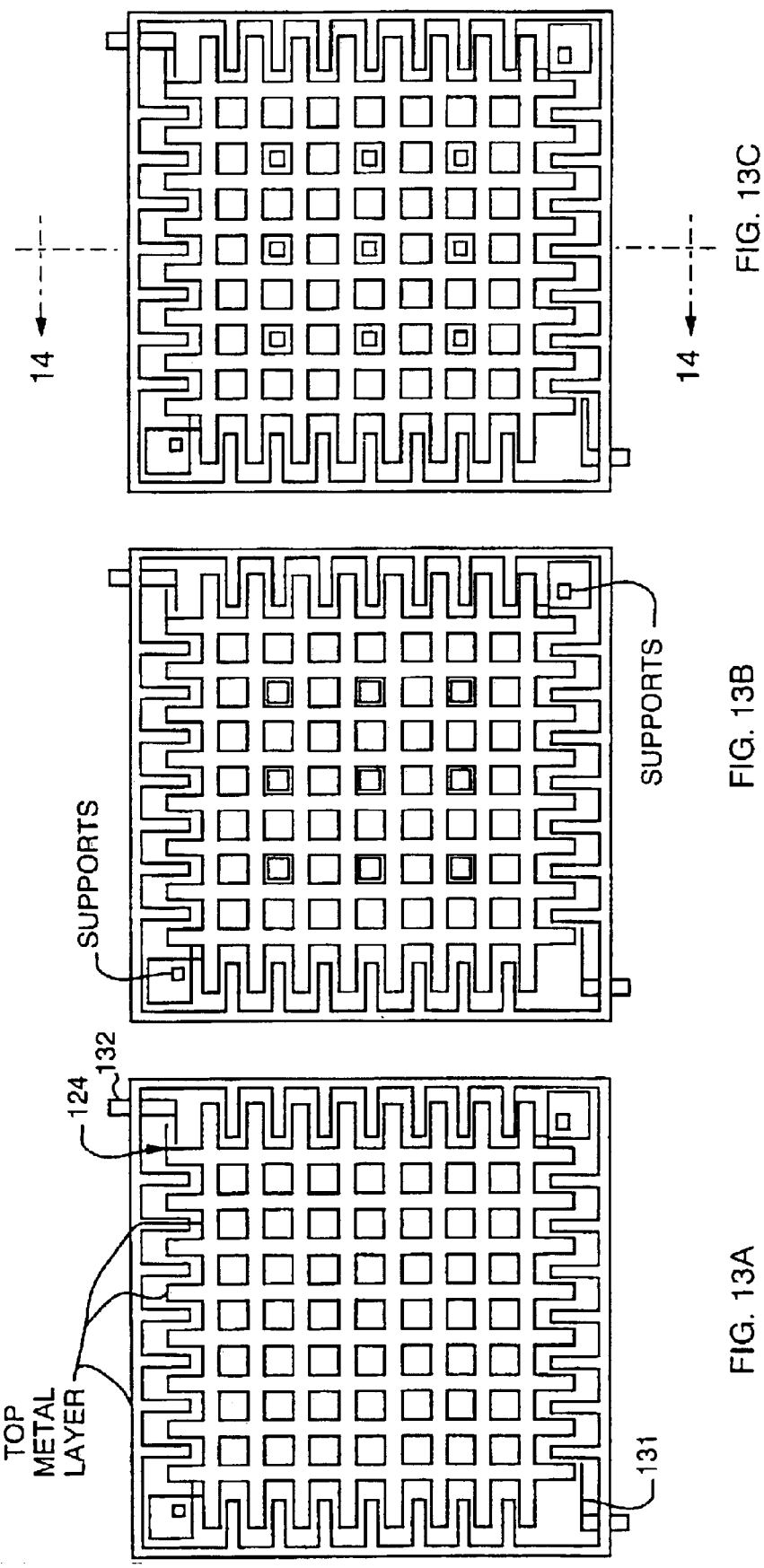

HIGH SENSITIVITY INFRARED SENSING APPARATUS AND RELATED METHOD THEREOF

CROSS-REFERENCE TO RELATED PROVISIONAL APPLICATION

The present application claims priority from U.S. Provisional Patent Application Ser. No. 60/184,553, filed Feb. 24, 2000, entitled "Levitated Infrared Sensors" the entire disclosure of which is hereby incorporated by reference herein.

FIELD OF THE INVENTION

The present invention relates generally to infrared (IR) sensors, and a method for using the same, and more particularly to improving the sensitivity of the infrared sensor by substantially reducing thermal conduction losses.

BACKGROUND OF THE INVENTION

Current infrared sensors, including imaging arrays for night vision applications, generally employ a platform coated with a material sensitive to infrared (IR) radiation. As shown in FIG. 1, during the operation of a conventional IR sensing apparatus 600, as IR energy 601 strikes an IR support platform 602, the IR sensitive coating 603 disposed on the platform 602 undergoes an increase in temperature, which causes a change in some physical parameter or electrical characteristic, generally electrical resistance. An electronic circuitry 604, located close to the platform 602 and which may be integrated with a substrate 605, detects this change in resistance or any other IR sensitive parameter. i.e., electrical or mechanical characteristic. The electrical circuit 604 is in electrical contact with the IR sensitive coating 603. There is also a mechanical connection or bridge 606 between the substrate 605 and the platform 602. Both the electrical contact and mechanical bridge provide a path for heat, which then contributes to the IR energy level received by the coating 603 to flow out of the platform 602, thereby lowering the sensitivity of the sensor. Heretofore, a great deal of effort has gone into making the thermal resistance of the mechanical suspension and electrical contacting as high as possible so as to increase the sensitivity of the detector.

In particular, there has been outstanding work in recent years in the area of uncooled bolometers. Several groups have reported bolometer arrays with noise equivalent temperature differences (NETD) less than 100 mK (See references: W. J. Parrish, J. T. Woolaway, G. Kincaid, J. L. Heath, and J. D. Frank, *Low Cost 160×128 Uncooled Infrared Sensor Array*, SPIB Conference on Infrared Electronics IV, Orlando, Fla. April 1998, pp. 111–119: P. Kruse, R. Dodson, S. Anderson, L. Kantor, M. Knipfer, and T. McManus, *Infrared Imager Bmploying 160×120 Pixel Uncooled Bolometer Array*, SPIE Conference on Infrared Technology and Applications XXIV, San Diego, Calif., pp. 572–577; R. A. Wood, *Uncooled Thermal Imaging with Monolithic Silicon Focal Planes*, Proc. SPIB, vol. 2020, 1993, pp. 322–329; and P. W. Kruse, *The Design of Uncooled Infrared Imaging Arrays*, Proc. SPIB, vol. 2746, 1996, pp. 34–37 (the foregoing publications are hereby incorporated by reference herein)). The August 1999 DARPA/MTO Optoelectronics Review anticipates that 640×480 arrays with 50 mK NETD will be developed in the year 2000. All of the systems described in published works to date still have undesirably large sensitivity limitations due to thermal conduction losses.

As discussed in, U. Ringh, C. Jansson, and K. Liddiard, *Readout Concept Employing a Novel On Chip 16 bit ADC for Smart IR Focal Plane Arrays*, Proc. SPIE, vol. 2745, 1996, pp. 99–110 (the foregoing publication is hereby incorporated by reference herein), bolometer sensitivity is fundamentally limited by the detector temperature fluctuation noise:

$$P^2_{\Delta T} = 4kGT^2$$

where $P^2_{\Delta T}$ is the noise power, T is temperature, and G is the thermal conductance of the detector to thermal "ground." NETD has also been shown to be proportional to $G^{1/2}$ in Kruse. Reducing thermal conductivity is therefore of great importance to the overall bolometer sensitivity. Wood has reported a thermal conductivity of 80 n W/°C. and an NETD of 40 mK.

A wide range of commercial applications will emerge for IR sensors as they become less expensive. Night navigation systems for cars and ships, systems for IR detection through walls and smoke, night sight systems for law enforcement, and night time oil spill and pollution detection systems are but some of the many potential commercial applications.

There is therefore a need in the art for an IR sensing system having improved sensitivity whereby the thermal conduction losses are substantially or completely eliminated, but for limited radiation loss through the surrounding vacuum.

Examples of conventional IR sensors and related art are disclosed in the following list of U.S. Patents, and are herein incorporated by reference:

Hornbeck-5,021,663;
Hornbeck-B1 5,021,663;
Cole-5,286,976;
Keenan-5,367,167;
Gates-5,554,849;
Koskinen-5,589,689;
Gerard-5,602,393;
Butler, et al.-5,821,598;
Butler, et al.-5,850,098;
Morris-5,900,799;
Vilain, et al.-5,912,464;
Wada, et al.-5,966,590;
Parrish, et al.-6,028,309

SUMMARY OF THE INVENTION

The present invention achieves a major improvement over traditional infrared sensors by levitating or suspending the IR platform to dramatically reduce the loss of IR energy, which normally dissipates in the form of heat. The levitating IR sensitive platform of the present invention has no contact with the substrate during energy absorption, thus eliminating a substantial disadvantage existing in the systems proposed heretofore.

In particular, the present invention IR sensitive platform of the sensor is levitated with electromagnetic fields, which may include, for example, electrostatic forces, magnetostatic forces, and various dynamic electromagnetic forces. Preferably, the levitation mechanism employed will be electrostatic interdigit drives, which provide both a vertical levitation force and centering forces in the horizontal plane (laterally and longitudinally). Irrespective of the levitation mechanism, however, the IR detector element is not in contact with the substrate, greatly reducing or eliminating all thermal conduction losses. The resulting bolometer sensitivity is limited only by radiation loss through the surrounding vacuum.

The present invention levitation mechanism comprises a new approach for thermal isolation of micro-bolometer elements in uncooled infrared detector arrays, as well as other IR sensor devices. The microelectromechanical system (MEMS) fabrication techniques and the new electrostatic field applications as discussed herein provide a unique long-wavelength infrared detector that is completely isolated from the substrate during energy absorption.

The present invention infrared sensitive platform is levitated with electrostatic forces within a cavity above the substrate, substantially or completely eliminating all thermal conduction losses. With thermal losses limited to radiated heat, the detector sensitivity will improve by an order of magnitude over currently achievable values.

Another advantage associated with the present invention, is that the electrostatic levitation approach advantageously allows for a unique and vastly improved infrared sensor apparatus operational mode. For instance, readout of the levitated sensor temperature may be accomplished by changing the levitation control potentials to temporarily force the infrared sensitive platform in contact with readout circuit electrodes. The change in properties of the detectors IR sensitive material (i.e., the film resistance) arising from the impact of IR is quickly read before significant heat is lost from the detector. By maintaining the detector in the readout position for a short time after the readout cycle is completed, the infrared sensitive platform is quenched to the substrate temperature, preparing the detector for a new absorption cycle with no "memory" of the previous cycle. An additional readout operation performed at the end of the quench period is used as a baseline for the next energy absorption period in order to maximize accuracy. As seen in Parrish et al. and Kruse and Dodson et al., a significant portion of system overhead and cost is devoted to correcting the many sources of error present in conventional bolometers.

The aforementioned absorb/readout/quench/readout (ARQR) operation of the present invention sensing system and related method thereof will eliminate most sources of per-element fixed pattern error by baseline subtraction when implemented with low-noise high accuracy circuits.

Another advantage of the ARQR operation, among other things, is that it eliminates the need for a mechanical chopper in front of the detector. By eliminating the mechanical chopper, the present invention quench cycle duration is much less than the absorb cycle duration. Providing a longer absorb cycle thereby allows a larger portion of the frame time to be allocated toward energy absorption as compared with a conventional infrared sensors having a chopper, thus improving efficiency.

Further yet, another advantage of the ARQR approach is that it will substantially lower the overall system cost and complexity, requiring only gain correction to compensate for variations in the detector thermal coefficient of resistance across the array.

Accordingly, the advantages of the present invention include providing a long-wavelength, preferably uncooled infrared micro-bolometer sensor, and method for using the same, utilizing, for example, electrostatically levitated sensing elements. One embodiment of the invention provides for a plurality of infrared sensitive regions constituting an array. The entire array may be levitated with each of the individual regions being read when the levitation voltage is reduced to allow for contact with the read out circuitry.

The foregoing and other features, objects and advantages of the present invention will be apparent from the following detailed description, taken in connection with the accompanying figures.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating preferred embodiments of the invention and are not to be construed as limiting the invention. In the drawings:

FIG. 9 is a cross sectional view of the embodiment of the levitated infrared sensor apparatus shown in FIG. 8 viewed along cut section IX—IX.

FIG. 13A illustrates a simplified shuttle layout and post-process steps with metal patterns defining the levitated shuttle, electrodes, and electrical contacts and the areas in the upper left and lower right corners representing unetched silicon which holds the shuttle in place during further post-processing.

FIG. 13B illustrates FIG. 13A after silicon nitride deposition and patterning.

FIG. 13C shows FIG. 13B after deposition and patterning of the IR sensitive layer.

DETAILED DESCRIPTION OF THE INVENTION

Figure 1:
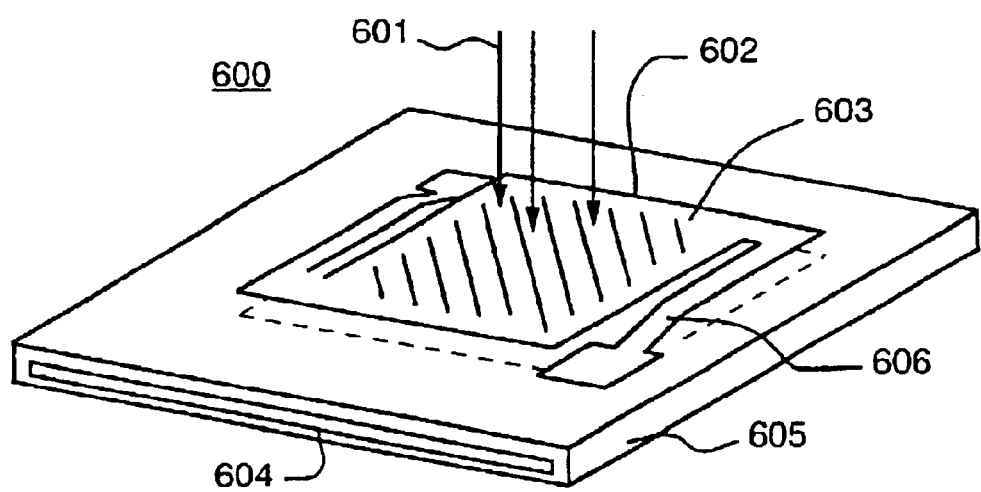
FIG. 1 is a schematic diagram of a conventional prior art sensor.
Figure 2:
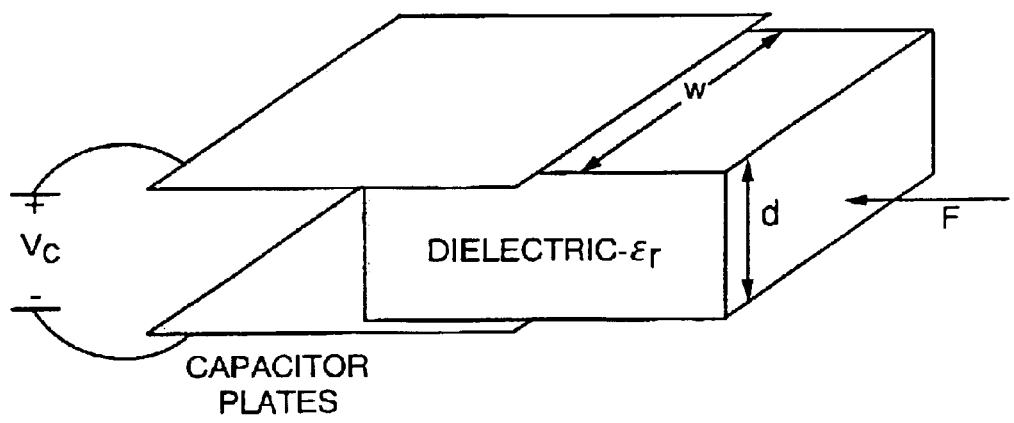
FIG. 2 is a conceptual schematic view of a dielectric slab partially inserted between capacitor plates.

Referring to FIG. 2, a principle upon which the operation of the present invention levitated sensor is derived therefrom is a classic electrostatic field problem—a dielectric slab is partially inserted between two metal capacitor plates. The electric field created by a voltage $V_c$ gives rise to a force $F_y$ on the dielectric slab, tending to move the dielectric into the region between the capacitor plates.

Analysis yields the following expression for $F_y$:

$$F_y = [E_0(E_r - 1)wV_c^2]/2d$$

Figure 3A:
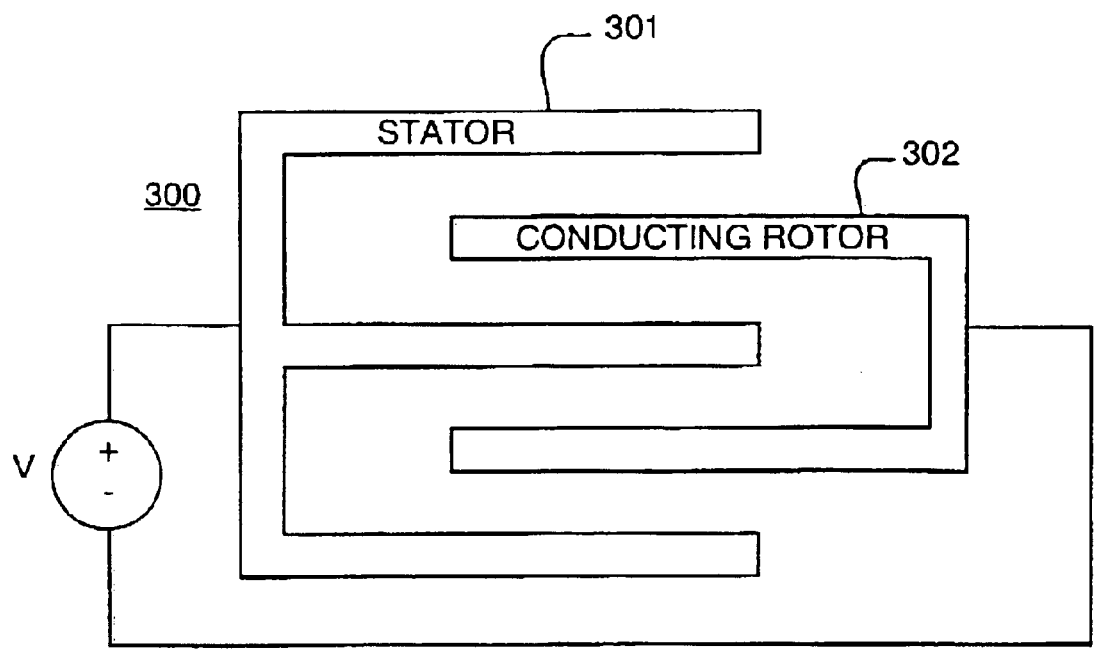
FIG. 3A shows a conventional MEMS comb-drive actuator comprising a set of conducting interdigitated electrodes that are each held at a well-defined potential.

Referring to FIG. 3A, a conventional MEMS comb-drive electrostatic actuator 300 is conceptually illustrated having two conducting interdigitated electrodes 301, 302 that are each held at a well-defined potential. A conventional conducting comb-drive actuator is taught in U.S. Pat. No. 5,969,848 to Lee et al., entitled "Micromachined Electrostatic Vertical Actuator," hereby incorporated by reference in its entirety herein.

Figure 3B:
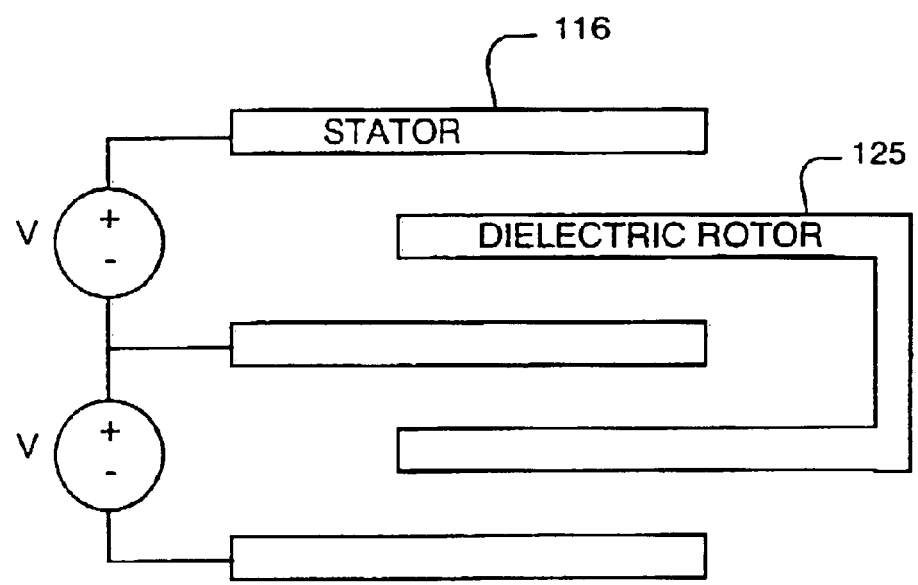
FIG. 3B shows a floating platform consistent with the present invention, completely detached from other elements, wherein the rotor is a dielectric, and the stator electrodes have alternating polarities of potential.

In contrast, as shown in FIG. 3B, there is provided a floating dielectric platform 125—completely detached from other elements—wherein the dielectric rotor platform 125 can not have a voltage set through any mechanical contact. And the stator electrodes 116 have alternating polarities of potential. The resultant force on the dielectric rotor 125 is directed to the left, and levitation of the dielectric rotor perpendicular to the plane of the paper.

Figure 4B:
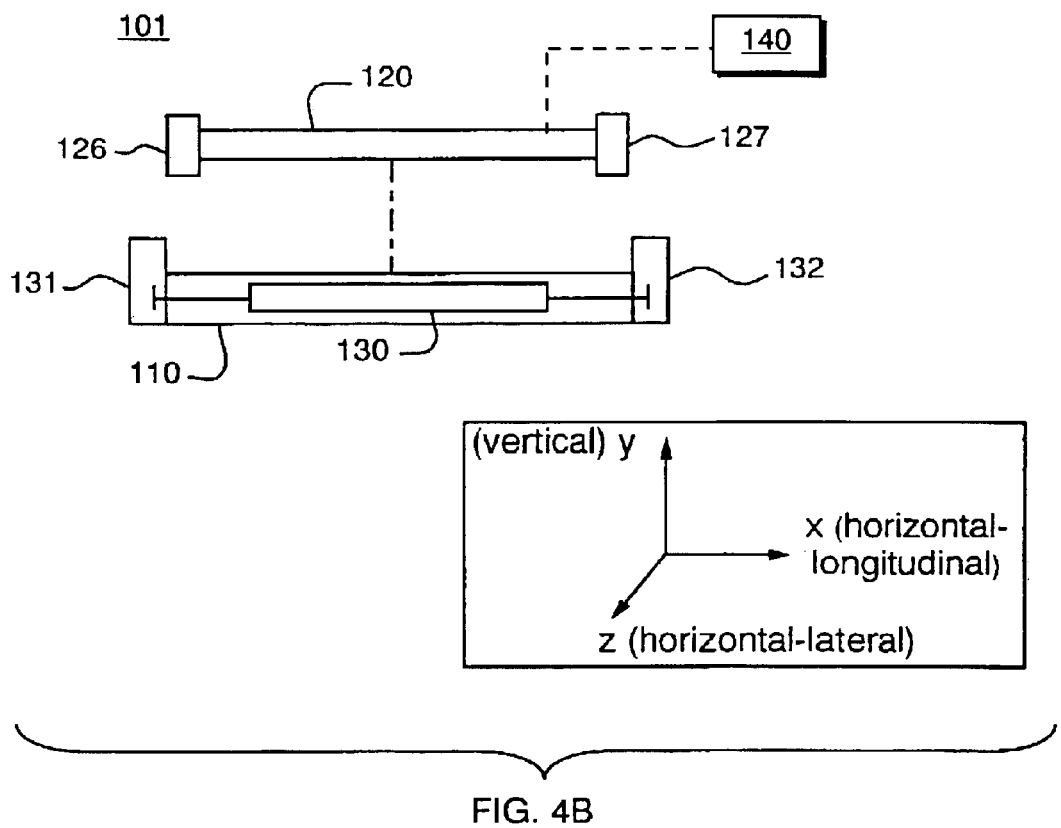
FIGS. 4A–4B are conceptual diagrams of one embodiment of the present invention IR sensing apparatus in a levitated position and a direct electrical coupling position, respectively.
Figure 4A:
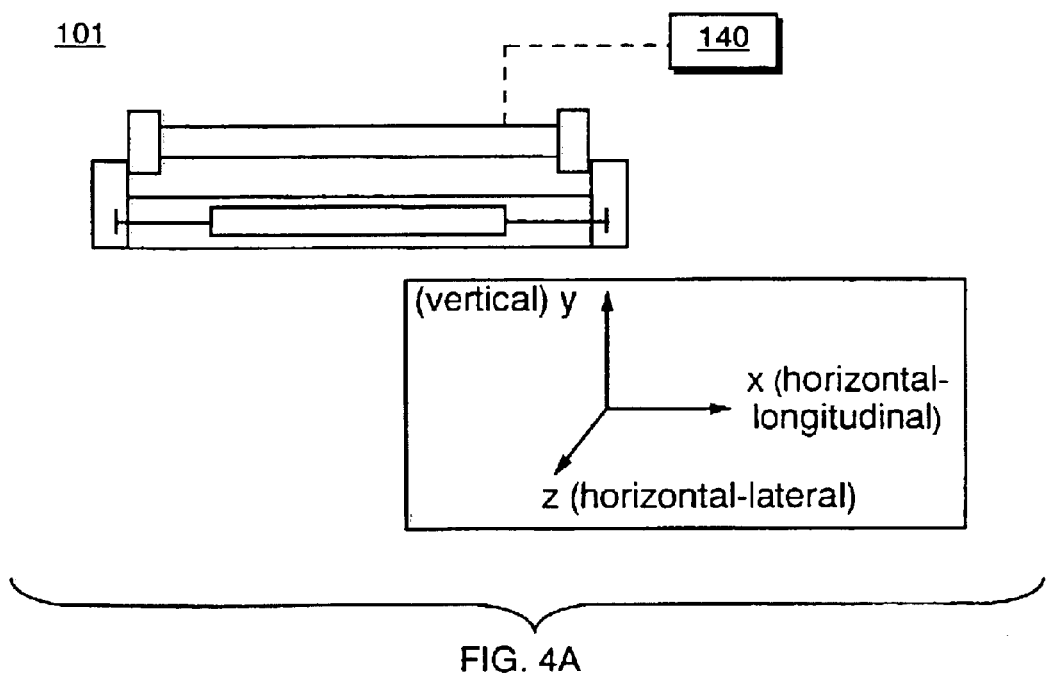

Turning to FIGS. 4A–4B, there is shown a conceptual diagram of the present invention IR sensing apparatus 101. Generally, as shown in FIG. 4A, the IR energy sensing apparatus 101 comprises a substrate 110 and an IR energy sensor member 120 for receiving incident IR energy. A readout circuit 130 is adapted for measuring levels of incident IR energy received by sensor member 120. A levitation mechanism 140 is operatively connected to the sensor member 120, wherein during an IR energy absorption period the levitation mechanism 140 is energized causing the sensor member 120 to levitate some proximately-spaced position from the substrate 110 without making physical contact with the substrate 110, the readout circuit 130, or any other structures.

After the absorption period, as shown in FIG. 4B, the levitation mechanism 140 is energized so as to cause the sensor member 120 to be repositioned in a manner that the sensor member makes physical contact with said readout circuit 130 so as to form a direct electrical coupling contact between said sensor member 120 and said readout circuit 130 to enable the readout circuit to interrogate the sensor member 120. Accordingly, the readout circuit obtains at least one measurement defining a post-absorption readout signal. For instance, the post-absorption readout is quickly obtained before significant heat is lost from the sensor member 120 to any surrounding structures.

Still referring to FIG. 4B, as sensor member 120 is in this physical contact position, heat will dissipate from the sensor member 120 to surrounding structures through thermal conduction, thereby quenching the sensor member 120.

Finally, after the quenching period is completed, then the readout circuit 130 interrogates the sensor member 120 thereby providing a baseline readout measurement for future operation cycles of the sensing apparatus 101. Therefrom the sensing member 120 is returned to the proximately-spaced position(s) as shown in FIG. 4A to begin subsequent operation cycle of the sensing apparatus 101. In summary, an operation cycle of the sensing apparatus may involve four basic steps including (1) absorption period, (2) post-absorption readout(s), (3) quenching period, and (4) post-quenching readout(s) (i.e., defining an ARQR cycle or process).

Figure 5A:
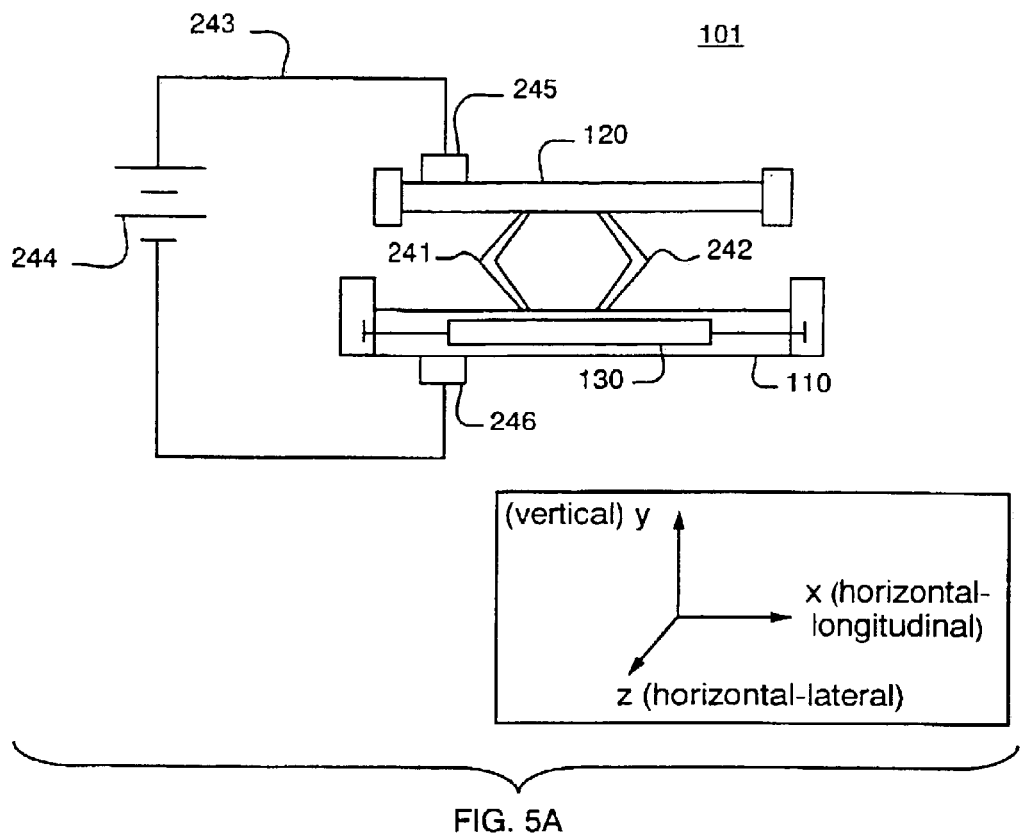
FIGS. 5A–5B are conceptual diagrams of another embodiment of the present invention IR sensing apparatus in a suspended position and a direct electrical coupling position, respectively.
Figure 5B:
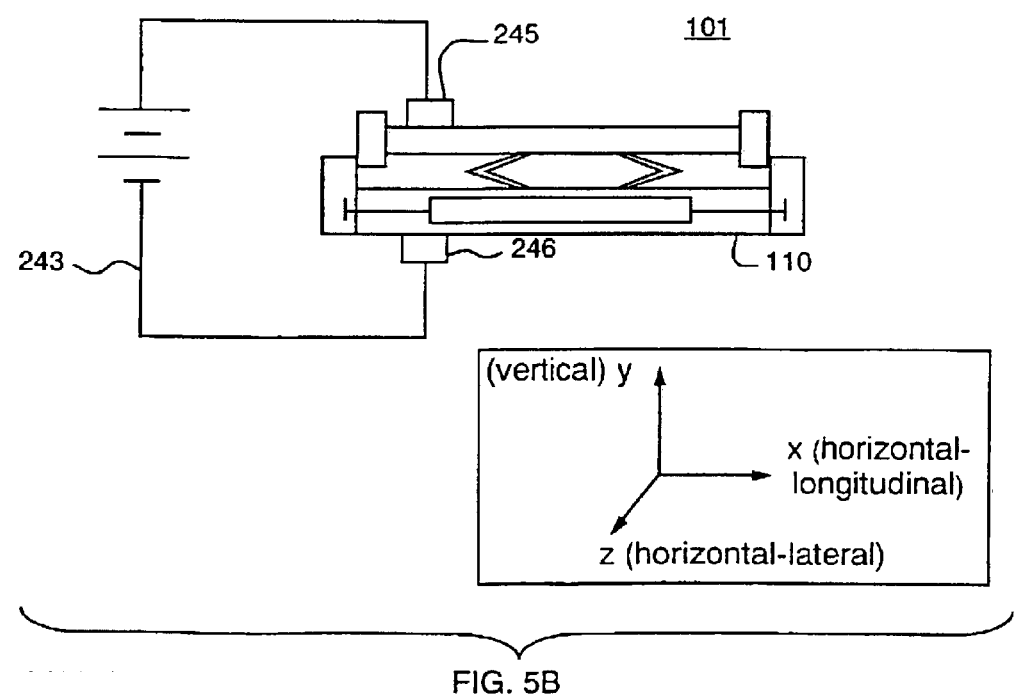

FIGS. 5A and 5B show an alternative embodiment of the present invention sensing apparatus 101 whereby the sensor member 120 is physically supported by one or more support structures 241, 242 to establish a proximate-spacing from the substrate 110, rather than being spaced by said levitation mechanism 140. As one skilled in the art would appreciate the support structures could be of various non-conductive materials and structural design to provide optimum thermal isolation. Some structural examples may include, but not limited thereto, legs, leaves, springs, coils, flexures, tethers, or solid/hollow supports. Moreover, a shift actuator 243 is utilized to exert a force on the sensor member 120 to shift or move the sensor member 120 from a proximately-spaced position(s), shown in FIG. 5A, to a physical contact position (s), shown in FIG. 5B, so that the sensor member 120 is in physical contact with the readout circuit to establish a direct electrical coupling contact with the readout circuit. The shift actuator 243 depicted includes a voltage source 244 in electrical communication with two capacitor plates 245, 246 that cooperate respectively with the sensor member 120 and the substrate 110. The shift actuator 243 being based on the parallel plate capacitor effect. Upon actuation of the shift actuator 243, the support structures 241, 242 yield to the electrostatic forces exerted by the capacitor plates 245, 246 allowing the sensor member 120 to be pulled in physical contact with said readout circuit 130. Those skilled in the art would recognize that other shifting mechanisms could be utilized.

Figure 6A:
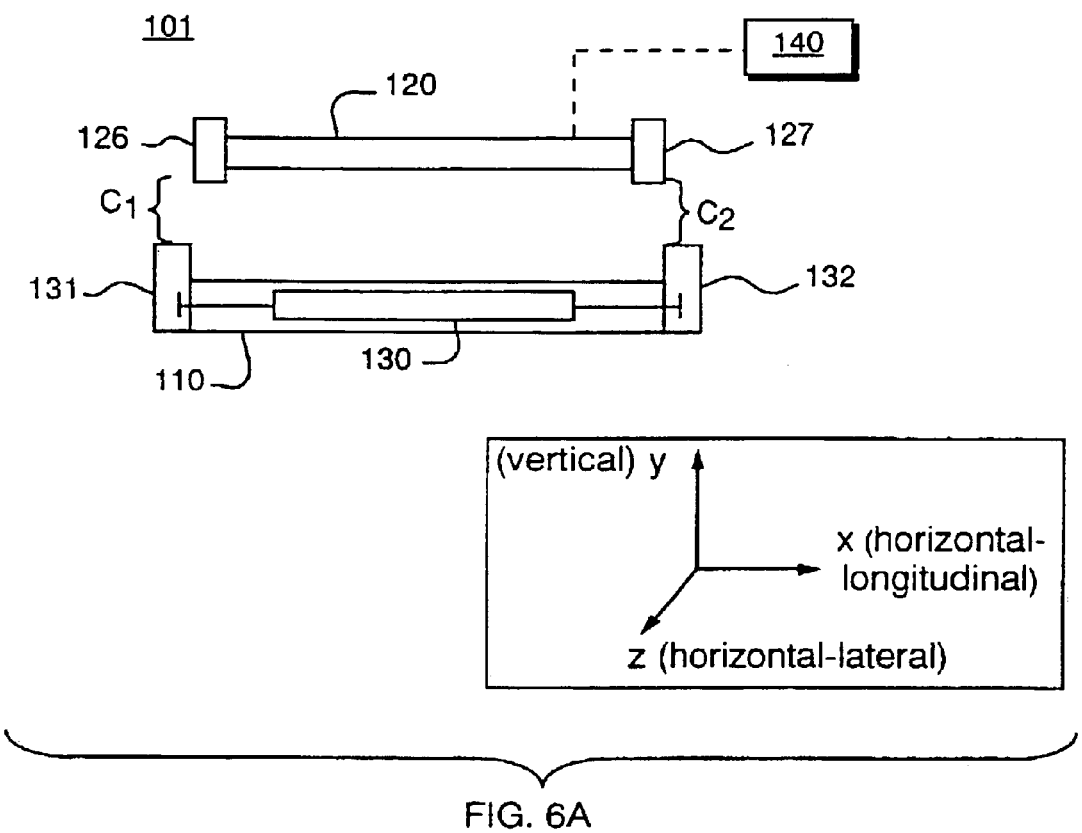
FIGS. 6A–6B are conceptual diagrams of another embodiment of the present invention IR sensing apparatus in a levitated, indirectly coupled position and a quenching position, respectively.
Figure 6B:
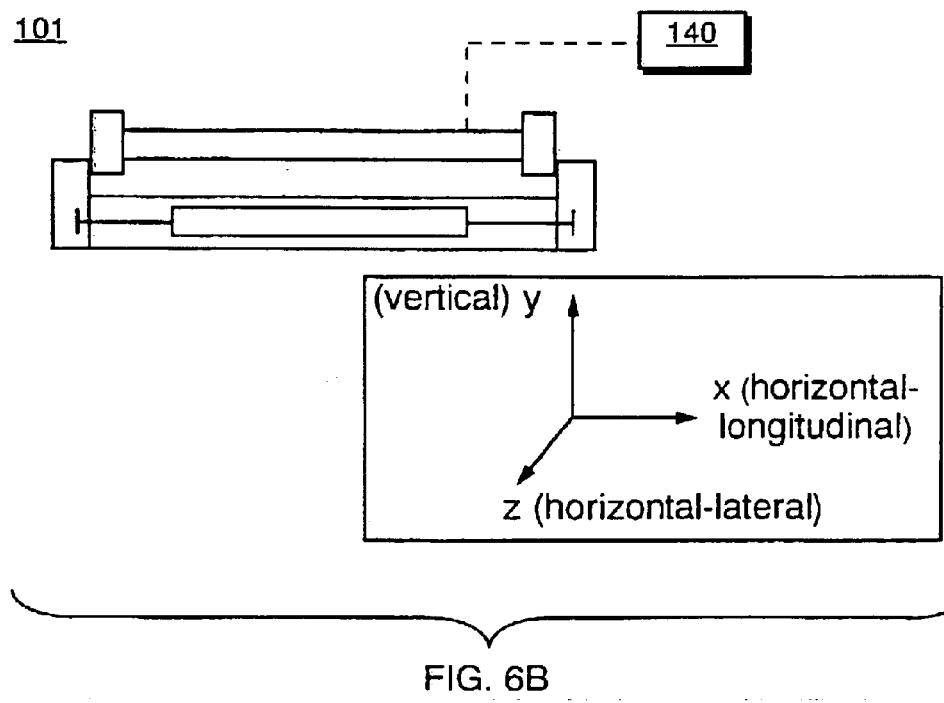

FIGS. 6A and 6B show yet another embodiment of the present invention whereby the readout interrogation is performed while the sensor member 120 remains in a proximately-spaced position(s). In particular, referring to FIG. 6A, in addition to the proximately-spaced position(s) of the sensor member 120 providing for an absorption period of the operation cycle, a proximately-spaced position(s) also provides for the electrical interrogation by readout circuit 130 on the sensor member 120 by way of indirect electrical coupling that is provided by the capacitive effect caused by the gap, denoted as "C1" and "C2", between the sensor member 120 and the readout circuit 130. Accordingly, the post-absorption readout can be performed without making any physical contact or direct coupling contact with any other structures. One skilled in the art would appreciate that indirect electrical coupling can be accomplished using various conventions, including for example, capacitive or inductive coupling.

Thereafter, turning to FIG. 6B, the levitation mechanism 140 is energized so as to cause the sensor member 120 to be repositioned in a manner that the sensor member makes physical contact with the substrate 110 and/or readout circuit 130 thereby allowing the heat to dissipate from the sensor member 120 to surrounding structures through thermal conduction, thereby quenching the sensor member 120.

Finally, after the quenching period is completed, the sensor member 120 can begin to return to a predetermined proximately-spaced position(s) allowing the readout circuit 130 to interrogate the sensor member 120 again so as to provide a post-quenching readout, thereby defining a baseline readout measurement for future operation cycles of the sensing apparatus 101. Again, the nominal cycle being the ARQR mode.

Figure 7A:
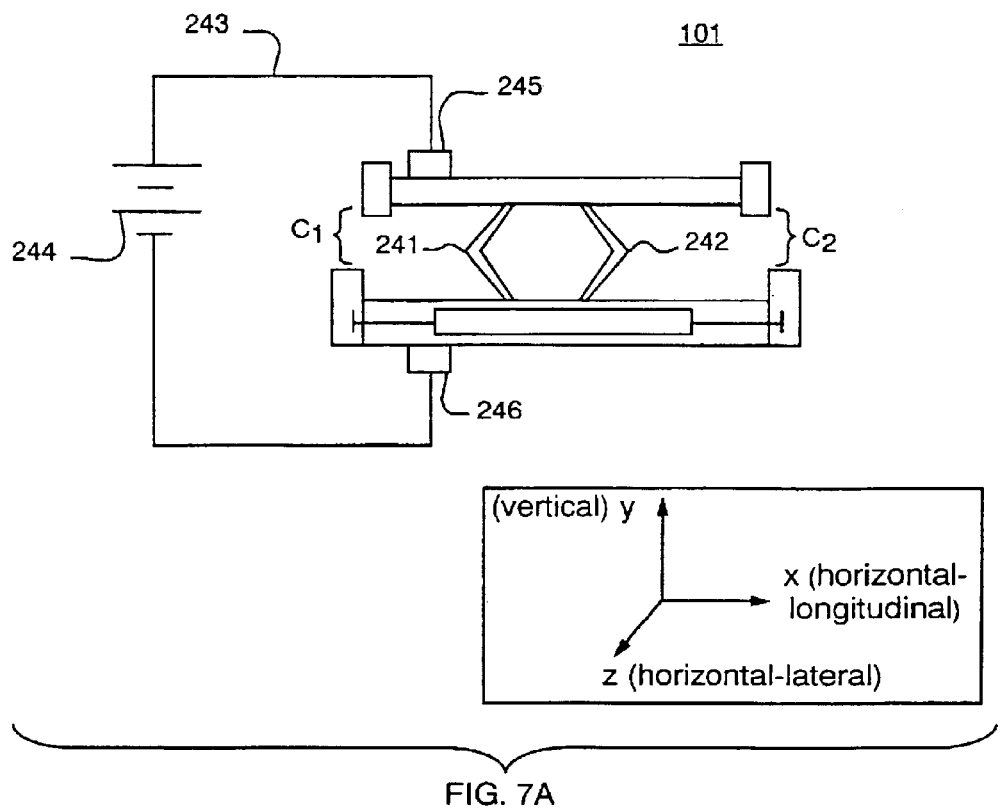
FIGS. 7A–7B are conceptual diagrams of yet another embodiment of the present invention IR sensing apparatus in a suspended, indirectly coupled position and quenching position, respectively.
Figure 7B:
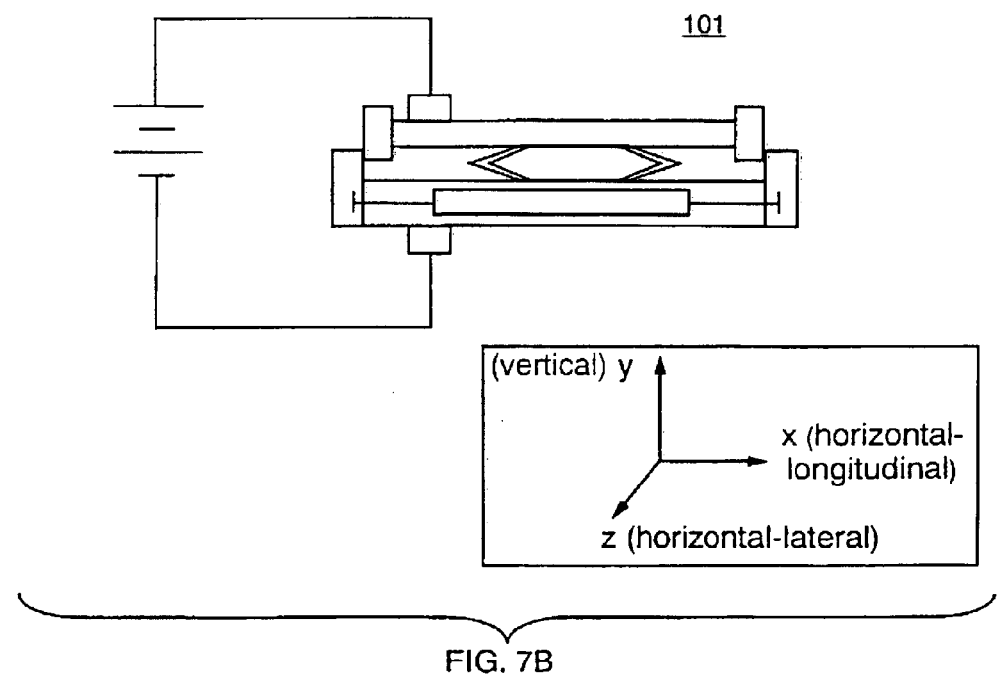

Further yet, FIGS. 7A and 7B show an additional embodiment of the present invention. Referring to FIG. 7A the electrical interrogation is effected by utilizing indirect electrical coupling while the support structures 241, 242 suspends the sensor member 120 in the proximately-spaced position(s). Next, as shown in FIG. 7B, the shift actuator 243 moves the sensor member 120 from the proximately-spaced position(s) to a second position(s) whereby the sensor member 120 physically contacts the readout circuit 130 for the quenching of the sensor member 120. At which time, or quickly thereafter, the post-quench read out can be performed.

The following examples are exemplary of suitable conditions employed in the design and fabrication of the present invention.

EXAMPLES

1. Thermally Isolated Infrared Sensor

Figure 8:
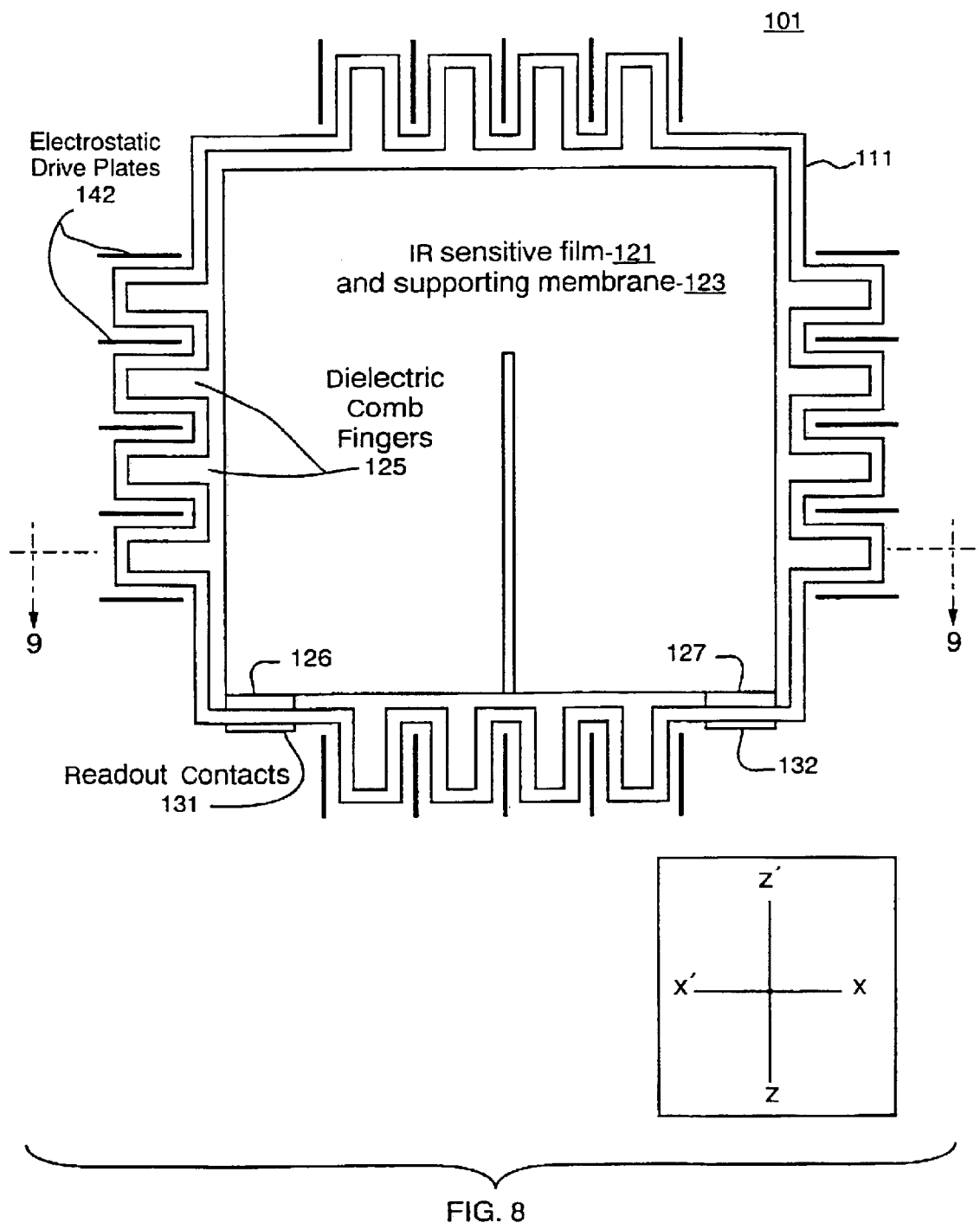
FIG. 8 is a top view of a schematic diagram of still yet another embodiment of the levitated infrared sensor apparatus of the present invention.

In carrying out the present invention, an the infrared sensing apparatus 101 is shown in FIGS. 7 and 8. Infrared sensitive material/film 121 and dielectric fingers 125 are shown affixed to a infrared sensitive platform 123. The plurality of dielectric comb fingers 125 are around the periphery of the infrared sensitive platform 123. The interface contacts 126, 127 which are located on the infrared sensitive platform 123 are also shown. This one particular embodiment of the levitation mechanism shows a plurality of electrostatic drive plates 142 as are part of the substrate 110. The plurality of drive plates 142 are interdigitated with the plurality of dielectric fingers 125. A reflective layer 117, typically a metal layers, is also shown as a top layer of a portion of the cavity 111.

Still referring to FIGS. 7 and 8, the readout contacts 131, 132 are shown as being attached to the substrate 110. The readout circuitry 130, which senses changes in the infrared sensitive material 121, is in communication with the IC interconnect 133. The infrared sensitive platform 123 is kept in tension and centered by the electrostatic drive plates on all four sides Conventional electrostatic actuation is a utilized mode of MEMS. Conventional conductive comb drives 12 are used in recent work at MIT by Wenjing and Mukherjee that describes a way to introduce force gradients into electrostatic comb drives by shaping the electrodes See Y. Wenjing, S. Mukheijee, *Optimal shape design of three-dimensional MBMS with applications to electrostatic comb drives*, International Journal for Numerical Methods in Engineering 45(2), 1999; p.175–94. Methods for calculating levitation forces inherent in comb drive structures have also been reported in G. He, K. Chen, S. Tan, W. Wang, *Electrical levitation for micromotors, microgyroscopes and microaccelerometers*, Sensors and Actuators A54, 1996, p.741–5 (the foregoing publications are hereby incorporated by reference herein).

Still referring to FIGS. 7 and 8, the levitation mechanism 140 is shown as an electrostatic interdigit drives including finger-like structures along the four sides of the detector. The geometry of electrostatic drive plate 142 and dielectric fingers 125 are configured wherein the forces generated during levitation can simultaneously center the detector 120 within the cavity 111 and levitate the infrared sensitive platform 123 above the substrate 110 (vertically). These forces also act to resist motion of the platform 123 perpendicular to the substrate 110 (i.e., horizontally—in the longitudinal and lateral directions). Using the above equation for $F_y$, and the materials system and geometries for a nominal 25 $\mu$m×25 $\mu$m detector, a 9V drive potential on the electrostatic drive plates 142 provides an out-of-plane centering force equivalent to greater than 100 g accelerations. The infrared sensitive film 121 composition and deposition process may comprise a conventional processes, such as one using a highly optimized vanadium oxide. Other deposition materials may include, but not limited thereto, titanium, titanium oxide, vanadium, amorphous silicon, alpha-silicon ($\alpha$-Si) and vanadium oxide including an oxygen content less than in VO2.

Another functional component of the present invention sensing apparatus 101 is a retention structure (not shown). When power is applied, electrostatic forces hold the platform 123 centered within the cavity 111 (i.e., moving along the x-axis; longitudinally, and moving along the z-axis; laterally) and positioned vertically (i.e., moving along the y-axis; vertically up or down) within the cavity. However, when power is not applied and when the device is processed through the final packaging steps, there are no electrostatic forces to keep the detector platform from departing from the substrate 110. Consequently, a retention structure may be put in place before the final release etch frees the platform from the substrate. It is contemplated that the retention structure may include, but not limited thereto, a pin, stop, stay, brace, latch, abutment, catch, latch, or the like.

Active feedback control of the levitation potentials may be avoided by employing drive plate geometries that provide a force gradient which reduces the "pulling" force on the dielectric fingers 125 as the dielectric 125 approaches the wall of the cavity 111. The force gradient will ensure stable in-plane centering of the detector platform 123.

The platform positioning may be accomplished by introducing an asymmetry in the electrostatic drive voltages, forcing the platform to one side of the suspension cavity or substrate cavity 111. The electrostatic drive plate 142 geometries may be optimized to create a proportional drive force and implement stable centering of the detector platform 123 within the cavity 111. By proper shaping of the drive plates 142, mechanical stability may be enforced and the complication of active feedback control of the electrostatic drive levitation voltages.

The simplest and therefore a preferred approach to creating electrical contact with the detector platform 123 involves the use of metallization exposed in the RIE etched channel. Electrical contact may be made by forcing the exposed metallization layers of the detector platform 123 into the exposed metal on the substrate side of the channel as the wall of the platform 123 comes in contact with the wall of the suspension cavity 111, generating a repeatable, reliable contact. Non-oxidizing coatings may be added to the exposed metallization. The shapes of the exposed metals may be manipulated, and/or a more complex vertical contacting scheme may be employed with dedicated contact structures.

In operation, readout preferably is accomplished by reducing the drive voltage on the drive plates 142 opposite the readout contacts 131, 132. This creates a force imbalance, which drives the detector towards the readout contacts 131, 132.

It is contemplated that readout of the sensor 120 characteristic via capacitively coupled circuits may also be employed, completely eliminating the need for forming direct coupling electrical contact with the levitated (or suspended) platform 123.

In addition to the low noise and high accuracy constraints common to all high-sensitivity uncooled micro-bolometer readout circuits, the readout electronics 130 for an electrostatically levitated bolometer preferably overcome two other challenges: First, the readout should occur quickly and inject minimal power into the sensor member 120 so that the temperature of the detector is not disturbed by the readout process. The readout circuit 130 should also overcome potentially significant uncertainty and variation in the detector contact resistance.

As hereinbefore set forth, contact for readout is accomplished by reducing the levitation voltages on the upper set of drive plates 142. If the magnitude of the variations is large, the variations could result in significant readout errors, effectively limiting NBTD. A four-wire resistance sensing topology may be preferable to eliminate contact resistance errors. As mentioned earlier, the ARQR operation provides for a measurement of detector baseline at the end of a thermal quench operation/period. In order to reduce system overhead, it may be preferable to integrate a low-noise offset-corrected readout amplifier which subtracts the baseline temperature measurement within each array element. The baseline subtraction can be performed by "memorizing" the detector current during the post-quench readout using a dynamically matched current source see H. J. Schouwenaars, D. W. J. Groneveld, and H. A. H. Termeer, *A Low-Power Stereo 16-bit CMOS D/A Converter for Digital Audio*, IEBB J. of Solid-State Circuits, Vol. 14, pp. 904–911, December 1988. (The foregoing publication is hereby incorporated by reference herein.) The stored baseline current is subtracted from the post-absorption detector current before integration. As compared to the approach that is used in Parrish et al., the present invention does not require the extensive per-pixel calibration of both the reference and readout current. In this manner, the actual image value retrieved from each pixel will be a $\Delta T$ measurement with offset errors already removed, and dependent only on the heat accumulated within the detector film during the last absorption cycle. If detector material temperature coefficient of resistance is found to vary significantly across the array, the host system will still need to perform a gain correction. However, by reducing calibration requirements, the baseline subtraction readout will result in substantial system level cost and complexity reductions.

As stated earlier, the levitated (or suspended) platform 123 upon which the infrared-sensitive thin film 121 is deposited, along with the dielectric comb fingers 125, constitutes a microelectromechanical system (MEMS). For optimum performance, the sensor platform 123 may be integrated with sensitive, low-noise amplifiers and readout circuitry. The mechanical elements therefore preferably are fabricated using a technology compatible with state-of-the-art integrated circuits (IC). The electronics may first be fabricated in an aggressive CMOS technology using the MOSIS brokerage service, followed by post-processing of the MOSIS chips to define the MEMS elements.

Additional Circuit Details

The ARQR operation provides for a measurement of detector baseline at the end of a thermal quench operation. To reduce system overhead, a low-noise, offset-corrected readout amplifier may be integrated which subtracts the baseline temperature measurement within each array element. The baseline signal is sampled-and-held on a capacitor. After the absorb cycle, the baseline signal is subtracted from the detector output voltage, amplified, and driven out of the image element. Since the baseline is stored within each pixel and the subtraction is performed in the analog domain, the output difference signal can be digitized with fewer bits than would be necessary if the baseline subtraction were performed in the digital domain, off-chip. It is contemplated that this level of functionality can be included within each pixel in light of T. N. Blalock, R. A. Baumgartner, and T. Hornak, *A 1.5 GOPS, Analog CMOS Array Processor with Integrated Optical Image Acquisition for position encoding applications,* Proc. of the 1998 Int. Sym. On VLSI Circuits, pp. 204–205, June 1998; and in context with the high density analog signal processing circuitry of T. N. Blalock, N. Gaddis, and R. W. Walker, *Analog Double-Buffered Ferroelectric Microdisplay Pixel,* Patent pending (The foregoing publications are hereby incorporated by reference herein). For example, the integrated circuit in the previous Blalock reference included an array of 1024×768 microdisplay pixels. Each of the 12 $\mu$m×12 $\mu$m pixels contained logic, a high resolution comparator and two analog storage elements.

The temperature is read as a voltage, and then converted to a current. The subtraction of the baseline signal can then be carried out in current mode. The baseline subtraction is performed by "memorizing" the detector current during the post-quench readout using a dynamically matched current source as in Schouwenaars et al., similar to the circuits in FIGS. 10A and 10B.

Figure 10A:
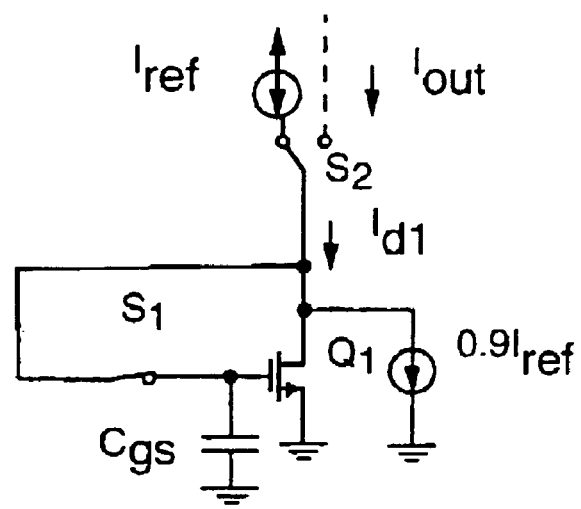
FIG. 10A is a schematic illustration of a simplified form of a dynamically matched current source in the calibration mode; see O. Johns and K. Martin, *Analog Integrated Circuit Design*, John Wiley and Sons, New York (1997), Chapter 12.
Figure 10B:
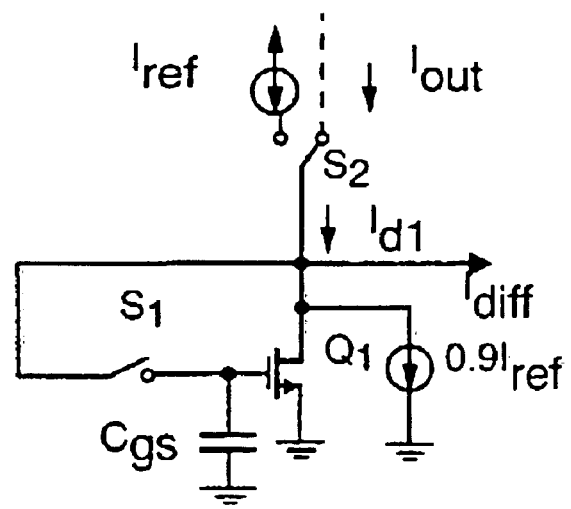
FIG. 10B is a schematic illustration of a simplified form of a dynamically matched current source in the regular usage mode; see O. Johns and K. Martin, *Analog Integrated Circuit Design*, John Wiley and Sons, New York (1997), Chapter 12.

As shown in FIGS. 10A and 10B, $I_{ref}$ represents the baseline current discussed above. The current $I_{out}$ is the absorption signal current. Baseline storage occurs during the "calibration" phase and subtraction occurs during "regular usage." The different current $I_{diff}$ represents ΔT, and flows into an integrator (not shown). The stored baseline current is subtracted from the post-absorption detector current before integration. In contrast to the approach used by Parrish et al., the present invention does not require the extensive per-pixel calibration of both the reference and readout currents. In this manner, the actual image value retrieved from each pixel will be a L1 T measurement with offset errors already removed, and depends only on the heat accumulated within the detector film during the last absorption cycle. If the detector material temperature coefficient of resistance varies significantly across the array, the host system will still need to perform a gain correction. However, by reducing calibration requirements, the baseline subtraction readout will result in substantial system level cost and complexity reductions.

Generally, the final quench temperature will be approximately the same between adjacent temporal frames, so one can acquire the absorption temperature measurement, and then subtract the temperature measured from the immediately following quench cycle, rather than the prior quench cycle. This reduces the storage time required, and allows the storage elements to be located in a dedicated row at the bottom of the array, if the total readout-quench-readout time is sufficiently short. In other words, a single row readout operation would include readout, quench, baseline readout and baseline subtraction. If desired, this also allows for performing the baseline subtraction in the digital domain on the imaging chip, with only one row of digital memory required.

As referred to previously, capacitive coupling (or other types of indirect coupling) to the detector resistor may be used to simplify the fabrication process by eliminating the need for direct coupling electrical contacts. This will also eliminate thermal losses during the readout process. As pixel sizes continue to shrink, the reduced thermal mass of the detector platform will require faster readouts to mitigate thermal loss during contact. Capacitive coupling solves this by keeping the detector platform 123 thermally isolated during readout.

Detection of the sensor resistance using a capacitive approach makes use of the CRC series circuit formed by the electrode vacuum gaps and the detector resistance. By placing these elements in the feedback loop of an oscillator, it is possible to generate a frequency that has a strong dependence on the resistance. This requires that the oscillator center frequency is such that the series capacitor impedance is roughly equivalent to the detector resistance. Assuming an oscillator frequency of 100 MHz and 5 fF coupling capacitances, the capacitive impedance will be 318 k.Ω. If an amorphous silicon detector is used, its nominal resistance can be designed to be approximately the same value, yielding an oscillator whose frequency is highly sensitive to the resistance value. An instructive readout method was employed by Ringh in an IR bolometer array as in, U. Ringh, C. Jansson, C. Svensson, and K. Liddiard, *CMOS RC-Oscillator Technique for Oigital Readout from an IR Bolometer Array*, Proc. of the 8th Int. Conf. on Solid-State Sensors and Actuators, Stockholm, Sweden, June 1995, pp. 138–141. (The foregoing publication is hereby incorporated by reference herein.) However, a much larger parallel capacitor was used instead of a series capacitor, and also operated at a much lower frequency. In modern CMOS processes, 1.8 GHz oscillators have been realized in, J. Craninckx and M. S. J. Steyaert, *A 1.8 GHz low-phase-noise CMOS VCO using optimized hollow spiral inductors*, IEEE Journal of Solid-State Circuits, vol. 32, no. 5, May 1997, pp. 736–44 so a 100 MHz or higher oscillator is easily achievable. (The foregoing publication is hereby incorporated by reference herein.) Pixel to pixel coupling is a major concern with oscillator frequencies in this range. Fortunately, the extensive metal electrodes forming the electrostatic-drive structures will provide excellent isolation between adjacent pixels.

2. Post-Fabrication Techniques for Sensing Apparatus

The post-process technology used to build the sensor apparatus 101 may incorporate laminated metal/insulator microstructures defined by the top-level metal in the CMOS process. Such technology, in general, was developed under a DARPA program, and is explained fully in references G. K. Fedder, S. Santhanam, M. L. Reed, S. C. Bagle, D. F. Guillou, M. S.-C. Lu, L. R. Carley, *Laminated High-Aspect-Ratio Microstructures Fabricated in a Conventional CMOS Process*, Sensors and Actuators A 57, 103–110, 1996. and L. R. Carley, M. L. Reed, G. K. Fedder, S. Santhanam, *Microelectromechanical Structure and Process of Making Same*, U.S. Pat. No. 5,717,631, issued Feb. 10, 1998. (The foregoing publications are hereby incorporated by reference herein.)

Figure 11A:
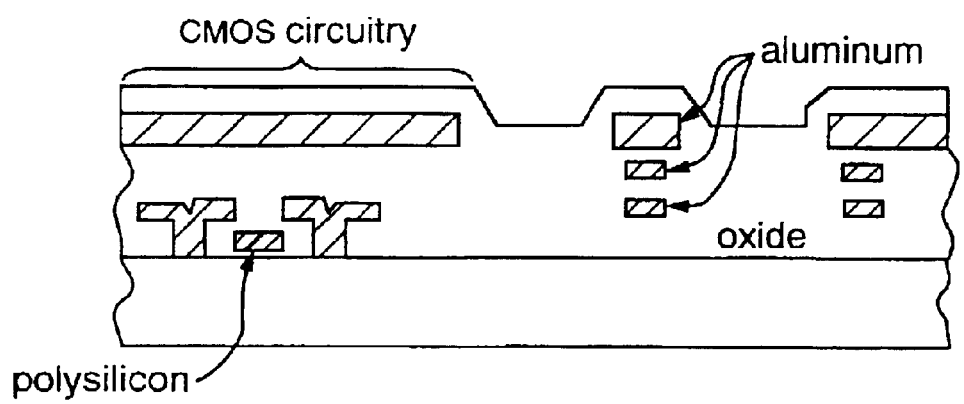
FIG. 11A is an illustration of MEMS component fabrication by post-processing of a completed CMOS chip in which the CMOS circuitry is protected from subsequent etching processes by the top level of metal.
Figure 11B:
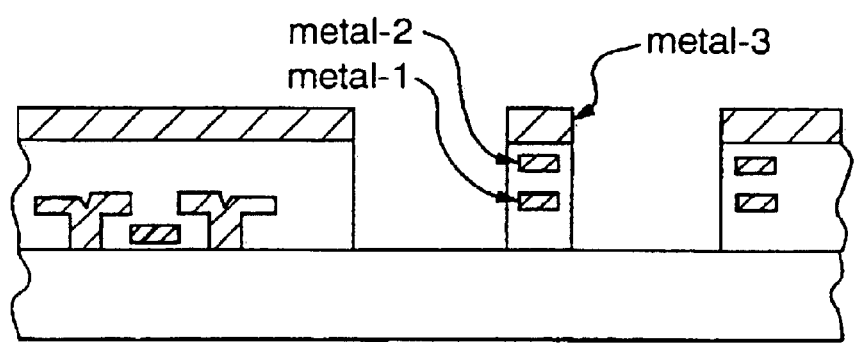
FIG. 11B is an illustration of MEMS component fabrication by post-processing of a completed CMOS chip in which a reactive ion etch down to the silicon substrate, masked by the top metal, produces laminated high-aspect ratio microstructures.
Figure 11C:
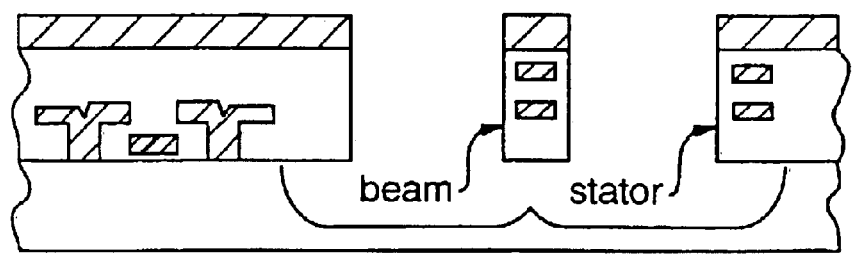
FIG. 11C is an illustration of MEMS component fabrication by post-processing of a completed CMOS chip in which the release of the movable elements by an isotropic etch is shown.

This aforementioned approach is generally illustrated in FIGS. 11A–11C The top layer of metal 112 serves two purposes: it defines the MEMS microstructures, and it protects the CMOS circuitry during the etching processes, which define and release the microstructures. After an isotropic reactive ion etch (RIE), and an isotropic release etch, high-aspect-ratio microstructures consisting of laminated beams of interconnect metal and dielectric $SiO_2$ are realized. The minimum geometry of the MEMS devices is set by the line and space design rules of the top level metal. For example, in the 0.25 μm MOSIS process (HP C7 process) one can define line/space combinations of 1.2 μm/1.2 μm in the top (fifth) metal layer. Thus, it is possible to realize micron-scale gaps in the drive electrodes, necessary for low drive voltages, without fine-line lithography during the post-process phase; the necessary lithography is already in place when the CMOS circuits are fabricated. One example are scanning electron micrographs of typical microstructures that are fabricated using this technology.

One of the primary advantages of this MEMS technology is that the microstructures can be built with a high aspect ratio (i.e., ratio of height to width). Such structures have a high degree of mechanical rigidity and resist curling and buckling. This feature is very useful to the levitated (suspended) IR sensor 120 as the platform 123 holding the IR sensitive film 121 should resist the effects of stress as the supporting 123 and sensitive films 121 are deposited.

Because, in one embodiment of the present invention, the detector requires an IR sensitive film, other post-process steps are necessary in addition to the etch steps defining the microstructures.

Accordingly, these process steps in are discussed below. One key departure from the current process is a refill step which replaces the etched oxide and silicon regions with a second sacrificial material. This step is necessary to define a surface upon which the IR sensitive film (and an insulating underlying film) can be deposited.

The refill process employed in the present invention is depicted in FIGS. 12A–12D. This "superstrate planarization process" was originally developed at the University of Virginia per reference W. L. Bishop, T. W. Crowe, R. J. Mattauch, *Planar GaAs Schottky Diode Fabrication: Progress and Challenges*, Fourth International Symposium on Space Terahertz Technology, Los Angeles, Mar. 30-Apr. 1, 1993, to build extremely low-capacitance air-bridge contact structures for planar GaAs Schottky diodes, but is also an ideal way to refill the etched chips with a second sacrificial material. (The foregoing publication is hereby incorporated by reference herein.)

Figure 12A:
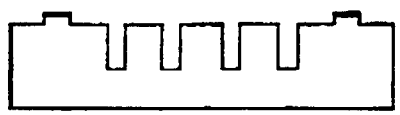
FIGS. 12A–12B illustrates the first step in the superstrate planarization process whereby a substrate wafer with trenches and perhaps shim regions are coated with a low viscosity resin.
Figure 12B:
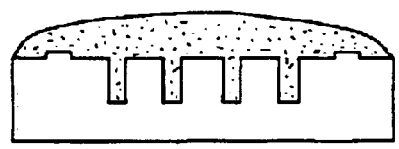

Referring to FIGS. 12A and 12B, the process includes filling the trenches and cavities 113 with a low-viscosity thermosetting epoxy resin 114, such as Epotek 377 or the like.

Figure 12C:
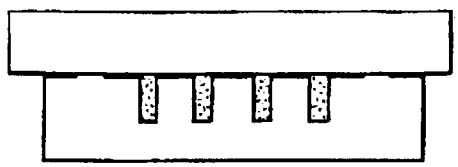
FIG. 12C illustrates the next step in the superstrate planarization process whereby the resin is planarized by mating with a superstrate such as an optical flat.

Next, turning to FIG. 12C, the resin surface is planarized by contacting it to an optical flat 114 which has been treated with a release agent; a suitable compound is octadecyltricholorosilane (OOTS) in n-octane which forms a self-assembled monolayer on the flat (see patent reference J. A. Prybyla, G. N. Taylor, "Device Fabrication Involving Planarization," U.S. Pat. No. 5,736,424, issued Apr. 7, 1998, and herein incorporated by reference in its entirety).

Figure 12D:
FIG. 12D illustrates the final step in the superstrate planarization process whereby after the curing and release of the superstrate, an exceptionally smooth and flat surface results with no lapping or polishing necessary.

Finally, as shown in FIG. 12D, the resin is cured while the flat is in place, then the flat is removed, leaving a perfectly planar surface. This procedure avoids complex chemical-mechanical polishing steps, but still results in superb surface quality over large areas. The Epotek resin has negligible shrinkage during curing, and can be completely removed with an oxygen plasma later in the process.

Further, the main steps of the post-process sequence are illustrated in the mask view of FIGS. 13A–13C and the cross sections in FIGS. 14A–14F. (For simplicity, the description here assumes that the readout circuitry is not directly under the pixel. Later, we will show that this is not an intrinsic limitation of the process; electronic circuitry can be placed underneath the pixel to improve the array fill factor.)

Figure 14A:
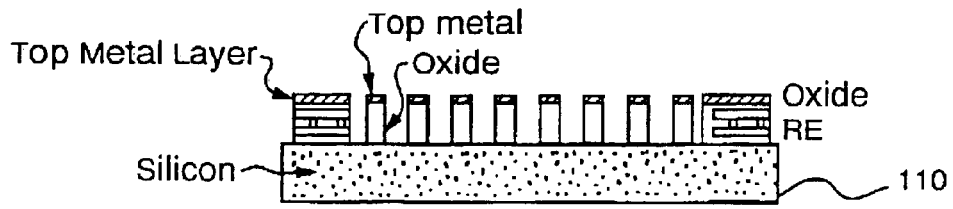
FIG. 14A is a cross-sectional view along cut line XIV—XIV in FIG. 13C at first stage of the post-process procedure.

As received from MOSIS, the CMOS integrated circuit has several layers of metal. The top layer of metal is used as a mask for a reactive ion etch (RIE) step which etches through the SiO2 interlevel dielectric. After this step, the wafer cross section is as shown at FIG. 14(A).

Figure 14B:
FIG. 14B illustrates FIG. 14A after a reactive ion etch of the oxide, masked by the top level metal, is followed by an isotropic silicon etch to define the levitated platform and the fixed stator electrodes.

Next, as shown in FIG. 14(B) an isotropic silicon etch is performed which undercuts the laminated metal/oxide structures. The shuttle is not completely released from the substrate due to large area supports shown in the top left and bottom right corners in FIGS. 13A–13C.

Figure 14C:
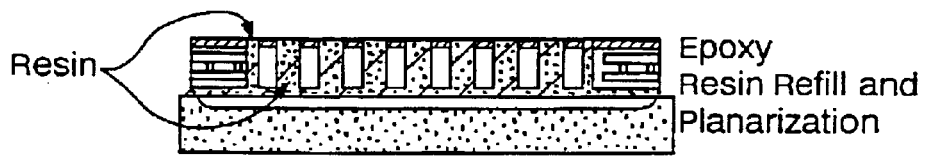
FIG. 14C illustrates FIG. 14B after the microstructures are then refilled and planarized with the superstrate process, similarly illustrated in FIG. 12A through 12D.

As initially shown in FIG. 14C, the regions which were etched away during these two steps are refilled with the Epotek resin. This layer provides support for the deposition and patterning of the next two subsequent layers, i.e., a silicon nitride insulating layer, and the IR-sensitive layer ($\alpha$-Si or $VO_x$). As demonstrated in M. Mescher, T. Abe, B. Brunett, H. Metla, T. B. Schlesinger, M. L. Reed, *Piezoelectric Lead-Zirconate-Titanate Actuator Films for Microelectromechanical Systems Applications*, Proceedings of the Bighth International Workshop on Micro Electro Mechanical Systems (MEMS-95), Amsterdam, January 1995, pages 261–266, a method is provided for sputter deposition of high quality, low-defect-density nitride films which involves optimizing the substrate temperature and target bias; the present invention process avoids the use of high-temperature chemical vapor deposition processes which cannot be used on metallized wafers. (The foregoing publication is hereby incorporated by reference herein.) These layers are patterned with several small holes so that oxygen plasma can find its way to the epoxy sacrificial material in the penultimate release step.

Figure 14D:
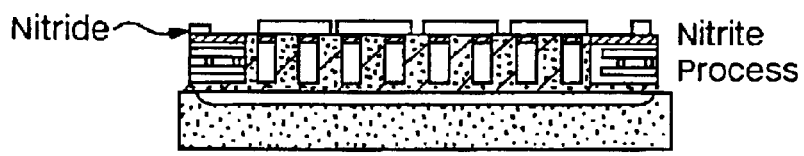
FIG. 14D illustrates FIG. 14C after an insulating film of silicon nitride is sputtered and patterned; this layer provides both structural integrity and isolates the IR sensitive layer from the underlying metal.
Figure 14E:
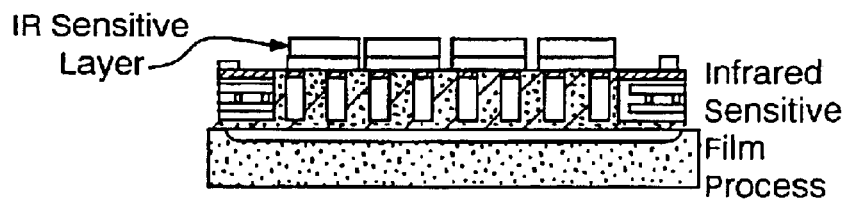
FIG. 14E illustrates FIG. 14D after the IR sensitive film is then deposited and patterned.

In particular, referring to FIGS. 14D–14E, holes in both the IR sensitive- and nitride films allow reactive oxygen from the plasma to reach the epoxy sacrificial layer for final release of the levitated platform, without significantly degrading the pixel fill factor (The oxygen reactant also diffuses in from the periphery of the shuttle, between the drive plates and dielectric fingers.) The IR sensitive layer automatically contacts electrodes on the metal 4 layer through holes in the metal 5 and nitride layers.

Figure 14F:
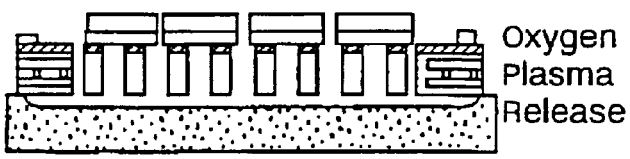
FIG. 14F illustrates FIG. 14E after using an oxygen plasma to remove the sacrificial resin.

Finally, as shown in FIG. 14F the platform is freed from the supporting silicon pedestals with a short isotropic etch. Although it is no longer tied to the substrate, it is prevented from flying away by a ridge of nitride around the periphery which overhangs an exposed rim of metal 4.

Conventional IR sensor processes generally employ multiple thin film depositions after fabrication of the readout electronics. These films act as sacrificial layers, for electrical connections, for mechanical support, for optical reflection, as a detector layer, and for passivation of the IR sensitive film. The post-process fabrication scheme we have described herein for the levitated (or suspended) sensor 120 requires a minimum of two lithography steps to pattern the nitride insulation and IR sensitive films. It is noted that we can easily incorporate additional films should the need arise. For example, the NEC bolometer array process in H. Wada, M. Nagashima, M. Kanzaki, T. Sasaki, A. Kawahara, Y. Tsuruta, N. Oda, S. Matsumoto, *Fabrication Process for 256×256 Bolometer-Type Uncooled Infrared Detector*, SPIE Proceedings 3224, 1997, pages 40–51, uses an overcoat of TiN as an efficient IR absorber. (The foregoing publication is hereby incorporated by reference herein.) The present invention levitated sensor process can accommodate this and other features.

Stress control is a concern in any process incorporating released microstructures. Stress in sputtered films can be varied by composition control, electrode spacing, and a multitude of other parameters see references M. Mescher, M. L. Reed, T. B. Schlesinger, *Stress Control in Sputtered Silicon Nitride Films*, Materials Research Society Spring 1997 Meeting, San Francisco. Published in MRS Symposia Proceedings 472, 1997,239–244, and T. Abe, M. L. Reed, *Low-Strain Sputtered Polysilicon for Micromechanical Structures*, Proceedings of the Ninth International IBBE Workshop on Micro Electro Mechanical Systems (MEMS-96), San Diego, February 1996, pages 258–262. (The foregoing publications are hereby incorporated by reference herein.) In the present invention application stress is less of an issue since the released microstructures will be completely unconstrained; unlike tethered elements which can exhibit out-of-plane curling arising from their anchors to the substrate. For instance, the present invention floating platform can relieve built-in stress by expanding or contracting. Of course, differential stress between layers can still cause warping, but this can be addressed by engineering the stress during the thin film depositions. An important feature of the present invention process is that all release etches are dry. In-process stiction is thus avoided, without the need for complex drying procedures, by using no wet chemical etch or rinse steps.

3. Electronics Embedded Underneath Pixel for Sensing Apparatus

Figure 15A:
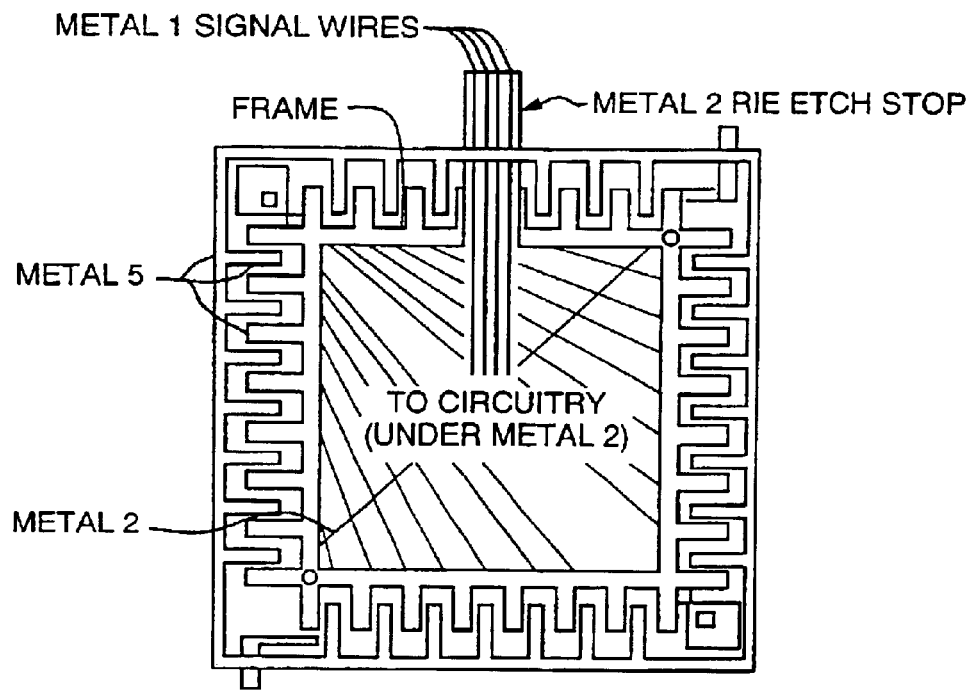
FIG. 15A illustrates a design of levitated structure incorporating electronics buried underneath the pixel before post-processing where the white areas are subject to the oxide RIE and isotropic silicon release etch and the inner structure forms a nearly continuous "frame" which becomes the periphery of the IR sensitive pixel.
Figure 15B:
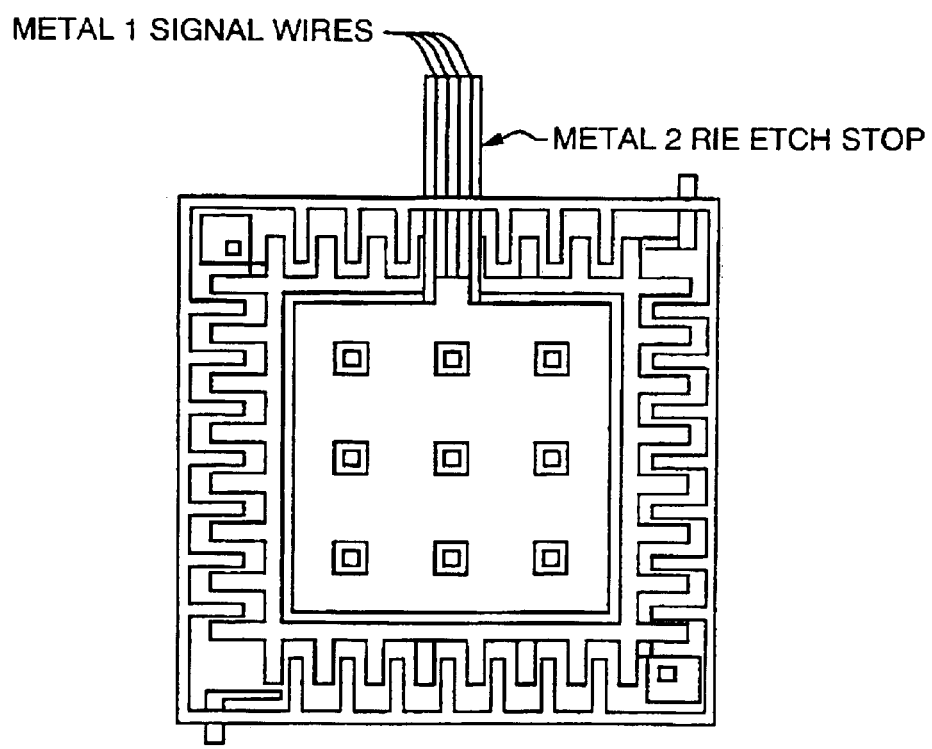
FIG. 15B illustrates FIG. 15A after deposition and patterning of the insulating silicon nitride and IR sensitive films where the metal 2 protection now forms the bottom reflecting layer of an optical cavity.

The present invention process described above produces a levitated platform 123 containing the IR sensitive pixel 121 by etching away the silicon underneath. While this process is advantageous, it limits the array fill factor by forcing the circuit designer to place the readout electronics elsewhere (i.e., not under the pixel). A minor variation of the shuttle design overcomes this limitation. A simplified mask design is shown in FIGS. 15A–15B. A main difference is that the levitated platform now consists of a frame of laminated metal/oxide microstructures, with the supporting and IR-sensitive films stretched across, much like a canvas around an artist's frame. The silicon under the pixel is protected from etching by a layer of metal 2; the electronic circuitry (not shown) is placed under this layer. Signals to and from the circuitry run in metal 1, protected from the reactive ion oxide etch by metal 2. A small break in the top-level metal 5 frame is necessary to connect the under-pixel circuitry with the rest of the chip.

Another advantage of this embedded configuration, for example, is that the mass of the platform is much reduced, which lowers the drive voltage needed to achieve levitation, and also decreases the thermal mass of the pixel. Yet another advantage is that the metal 2 layer now forms the bottom reflecting layer of an optically resonant cavity, improving the sensitivity of the sensor. The height of this cavity can be electrically tuned by applying a potential to the metal 2 layer, which counteracts the levitation force provided by the peripheral comb structures. The chief drawback of this design is the reduction in mechanical rigidity arising from the removal of the microstructure cross-struts inside the pixel. This can be alleviated, if necessary, by extending the supporting peripheral frame inside the pixel in a serpentine curve.

Accordingly, the embodiments described throughout provide a number of significant advantages.

For instance, the present invention greatly reduces or eliminates all thermal conduction losses as the IR detector element is not in contact with the substrate, The resulting bolometer sensitivity is limited only by radiation loss through the surrounding vacuum.

Another advantage of the present invention is that as the levitated or suspended infrared sensitive platform substantially or completely eliminates all thermal conduction losses, and the detector sensitivity will improve by an order of magnitude over currently achievable values.

Another advantage associated with the present invention, is that the electrostatic levitation approach advantageously allows for a unique and vastly improved infrared sensor apparatus operational mode. In particular, by maintaining the detector in the readout position for a short time after the readout cycle is completed, the infrared sensitive platform is quenched to the substrate temperature, preparing the detector for a new absorption cycle with no "memory" of the previous cycle.

Still yet another advantage of the present invention is that it eliminates a significant portion of system overhead and cost that is devoted to correcting the many sources of error present in conventional bolometers.

Further still, another advantage of the ARQR operation, among other things, is that it eliminates the need for a mechanical chopper in front of the detector. By eliminating the mechanical chopper, the present invention quench cycle duration is much less than the absorb cycle duration. Providing a longer absorb cycle thereby allows a larger portion of the frame time to be allocated toward energy absorption as compared with a conventional infrared sensors having a chopper, thus improving efficiency. It further provides significant design latitude.

Further yet, another advantage of the ARQR approach is that it will substantially lower the overall system cost and complexity, requiring only gain correction to compensate for variations in the detector thermal coefficient of resistance across the array.

Moreover, the sensor of the present invention has a sensitivity essentially limited only by radiation losses from the pixel. Without any material contact, heat conduction losses are reduced essentially to zero, making conventional pixel support structures obsolete for high-sensitivity applications. Regardless of further improvements in conventional IR sensitive film detection, electronics, or device design, it is impossible for conventional designs to reduce the conduction loss mechanism below zero. The present invention, bolometer design is hereby sets a new standard for which any future devices will need to meet. The invention dynamically changes the thermal characteristics of conventional systems.

Still further, the independent control of absorption and thermal quench cycle times of the present invention will further increase the device sensitivity by allowing the pixels to integrate nearly all of the received radiation.

The invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims rather than by the foregoing description, and all changes which come within the meaning and range of equivalency of the claims are therefore intended to be embraced therein.

We claim:

1. An IR energy sensing apparatus comprising:
   a substrate;
   an IR energy sensor member for receiving incident IR energy;
   a readout circuit operatively connected to said substrate, whereby said readout circuit being adapted for measuring level of incident IR energy received by said sensor member; and
   a levitation mechanism operatively connected to said sensor member for levitating said sensor member, said levitated sensor member having no physical or thermal contact while receiving incident IR energy, wherein:
   said levitation mechanism is energized at a first level, said levitation mechanism causes said sensor member to levitate proximately-spaced from said substrate without making physical contact with said substrate, said readout circuit, or any other structures; and
   said levitation mechanism is energized at a second level, said levitation mechanism repositions said sensor member, whereby said sensor member makes physical contact with said readout circuit so as to form a direct electrical coupling contact between said sensor member, whereby said readout circuit is capable of interrogating said sensor member.

2. The sensing apparatus according to claim 1, wherein:
   said IR energy sensor member receives the incident IR energy for a predetermined duration thereby providing an absorption period, said absorption period occurring at least in part while said sensor member is in said proximately-spaced position.

3. The sensing apparatus according to claim 2 wherein:
   said readout circuit interrogates said sensor member one or more times as said sensor member is initially electrically coupled thereby providing a post-absorption readout.

4. The sensing apparatus according to claim 3 wherein:

said sensor member makes physical contact with said readout circuit for a predetermined duration thereby providing a thermal quenching period, whereby heat dissipates from said sensor member by thermal conduction to said readout circuit and substrate.

5. The sensing apparatus according to claim 4, wherein:

said readout circuit interrogates said sensor member one or more times after said quenching period while said sensor is in direct electrical coupling contact providing a post-quench readout, whereby said post-quench readout can serve as baseline readout measurement for future cycles.

6. The sensing apparatus according to claim 1, wherein the incident IR energy varies the electrical characteristic of said sensor member.

7. The sensing apparatus according to claim 1, wherein:

said readout circuit is adapted for measuring the level of received incident IR energy according to the varied electrical characteristic of said sensor member.

8. The sensing apparatus according to claim 7, wherein said varied electrical characteristic includes a property selected from the group consisting of:

electrical resistance, electrical capacitance, electrical voltage, electrical inductance, and electrical current.

9. The sensing apparatus according to claim 1, wherein the incident IR energy varies the mechanical characteristic of said sensor member.

10. The sensing apparatus according to claim 1, wherein said sensor member is selected from a group consisting of: pyroelectric device, bolometer device, thermocouple device, thermopile device, thermo IR detecting device, photon detector, piezoelectric device, CCD, and CMOS.

11. The sensing apparatus according to claim 1, wherein said sensor member comprises an absorptive material comprising a polycrystalline semiconductor layer.

12. The sensing apparatus according to claim 1, wherein said sensor member is comprised of a material selected from the group consisting of: titanium, titanium oxide, vanadium, vanadium oxide, amorphous silicon, alpha-silicon (αSi), and vanadium oxide including an oxygen content less than in $VO_2$.

13. The sensing apparatus according to claim 1, wherein said levitation mechanism is a plurality of electromagnetic field generators, wherein said electromagnetic fields are energized from a group consisting of: electrostatic forces, magnetostatic forces, and various dynamic electromagnetic forces.

14. The sensing apparatus according to claim 1, wherein said levitation mechanism comprises:

dielectric fingers attached to said sensor member; and stator electrode fingers mounted to said substrate, wherein said dielectric fingers and said electrode fingers are in an interdigitated relationship with one another.

15. An IR sensing apparatus comprising:

a substrate;

an IR sensor member for receiving incident IR energy;

a readout circuit operatively connected to said substrate, whereby said readout circuit being adapted for measuring level of incident IR energy received by said sensor member; and a levitation mechanism operatively connected to said sensor member for levitating said sensor member, said levitated sensor member having no physical or thermal contact while receiving incident IR energy, wherein:

when said levitation mechanism is energized said levitation mechanism causes said sensor member to levitate proximately-spaced from said substrate without making physical contact with said substrate, said readout circuit, or any other structures, whereby an indirect electrical coupling between said sensor member and said readout circuit is formed, whereby said readout circuit is capable of interrogating said sensor member;

said IR energy sensor member receives the incident IR energy for a predetermined duration thereby providing an absorption period, said absorption period occurring at least in part while said sensor member is in said proximately-spaced position:

said readout circuit interrogates said sensor member one or more times as said sensor member is indirectly electrically coupled thereby providing a post-absorption readout: and when said levitation mechanism is energized at a second level, said levitation mechanism repositions said sensor member, whereby said sensor member makes physical contact with said readout circuit for a predetermined duration thereby providing a thermal quenching period, whereby heat dissipates from said sensor member by thermal conduction to said readout circuit and substrate.

16. The sensing apparatus according to claim 15, wherein:

said mechanism is energized at said initial or a different level, said levitation mechanism causes said sensor member to levitate proximately-spaced from said substrate without making physical contact with said substrate, said readout circuit, or any other structures.

17. The sensing apparatus according to claim 16, whereby an indirect electrical coupling between said sensor member and said readout circuit is reestablished to enable said readout circuit to interrogate said sensor member, and wherein: said readout circuit interrogates said sensor member one or more times after said quenching period while said sensor is in indirect electrical coupling providing a post-quench readout, whereby said post-quench readout can serve as baseline readout measurement for future cycles.

18. An IR energy sensing apparatus comprising:

a substrate;

an IR energy sensor member for receiving incident IR energy;

a readout circuit operatively connected to said substrate, whereby said readout circuit being adapted for measuring level of incident IR energy received by said sensor member;

at least one support structure positioned between said substrate and said sensor member to provide for said sensor member to be proximately-spaced from said substrate, wherein one end of said support being attached to said substrate and the other end being attached to said sensor member; and a shift actuator operatively connected to said sensor member, wherein:

said shift actuator is energized at a first level said shift actuator allows said sensor member to remain in a proximately-spaced distance from said substrate without making electrical contact with said readout circuit; and said shift actuator is energized at a second level, said shift actuator causes said sensor member to reposition, whereby said sensor member makes physical contact with said readout circuit so as to form a direct electrical coupling contact between said sensor member, whereby said readout circuit being capable of interrogating said energy sensor member.

19. The sensing apparatus according to claim 18, wherein: said IR energy sensor member receives the incident IR energy for a predetermined duration thereby providing an absorption period, said absorption period occurring at least in part while said sensor member is in said proximately-spaced position.

20. The sensing apparatus according to claim 19, wherein: said readout circuit interrogates said sensor member one or more times as said sensor member is initially electrically coupled thereby providing a post-absorption readout.

21. The sensing apparatus according to claim 20, wherein: said sensor member makes physical contact with said readout circuit for a predetermined duration thereby providing a thermal quenching period, whereby heat dissipates from said sensor member by thermal conduction to said readout circuit and substrate.

22. The sensing apparatus according to claim 21, wherein: said readout circuit interrogates said sensor member one or more times after said quenching period while said sensor is in direct electrical coupling contact providing a post-quench readout, whereby said post-quench readout can serve as baseline readout measurement for future cycles.

23. An IR energy sensing apparatus comprising:
a substrate;
an IR energy sensor member for receiving incident IR energy;
a readout circuit adapted for measuring level of incident IR energy received by said sensor;
at least one support structure positioned between said substrate and said sensor member to provide for said sensor member to be proximately-spaced from said substrate, wherein one end of said support being attached to said substrate and the other end being attached to said sensor member; and
a shift actuator operatively connected to said sensor member, wherein while said shift actuator is energized at a first level said shift actuator allows said sensor member to remain in a proximately-spaced distance from said substrate without making electrical contact with said readout circuit, whereby an indirect electrical coupling between said sensor member and said readout circuit is formed, whereby said readout circuit is capable of interrogating said sensor member wherein:
said IR energy sensor member receives the incident IR energy for a predetermined duration thereby providing an absorption period, said absorption period occurring at least in part while said sensor member is in said proximately-spaced position:
said readout circuit interrogates said sensor member one or more times as said sensor member is indirectly electrically coupled thereby providing a post-absorption readout: and
said shift actuator is energized at a second level, said shift actuator repositions said sensor member, whereby said sensor member makes physical contact with said readout circuit for a predetermined duration thereby providing a thermal quenching period, whereby heat dissipates from said sensor member by thermal conduction to said readout circuit and substrate.

24. The sensing apparatus according to claim 23, wherein:
said shift actuator is energized at said initial or a different level, said shift actuator causes said sensor member to move to proximately-spaced distance from said substrate without making electrical contact with said readout circuit.

25. The sensing apparatus according to claim 24, whereby an indirect electrical coupling between said sensor member and said readout circuit is reestablished to enable said readout circuit to interrogate said sensor member; and wherein:
said readout circuit interrogates said sensor member one or more times after said quenching period while said sensor is in indirect electrical coupling providing a post-quench readout, whereby said post-quench readout can serve as baseline readout measurement for future cycles.

26. A method of sensing IR energy comprising the steps of:
a) providing a substrate;
b) providing a readout circuit;
c) receiving incident IR energy using an IR energy sensor member; and
d) levitating said IR energy sensor member, said levitated sensor member having no physical or thermal contact while receiving IR energy, whereby:
said sensor member is levitated to a first position proximately-spaced from said substrate and said readout circuit so as to avoid any physical contact with said substrate, said readout circuit, or any other structures, and said method further comprising the step of:
periodically levitating said sensor member to a second position, whereby said sensor member is in direct electrical coupling contact with said readout circuit, whereby said readout circuit is capable of interrogating said sensor member.

27. The method of sensing IR energy according to claim 26, wherein;
said receiving incident IR energy step is carried out for a predetermined duration thereby providing an absorption period, said absorption period occurring at least in part while said sensor member is in said proximately-spaced position.

28. The method of sensing IR energy according to claim 27, wherein: said method further includes interrogating said sensor member one or more times as said sensor member is initially electrically coupled thereby providing a post-absorption readout.

29. The method of sensing IR energy according to claim 28, wherein: said step for levitating said sensor member at second position is carried out for a predetermined duration thereby providing thermal quenching period, whereby heat dissipates from said sensor member by thermal conduction to said readout circuit and substrate.

30. The method of sensing IR energy according to claim 29, wherein:
said method further includes interrogating said readout circuit one or more times after said quenching period while said sensor is in direct electrical coupling contact providing a post-quench readout, whereby said post-quench readout can serve as baseline readout measurement for future cycles.

31. A method of sensing IR energy comprising the steps of:
a) providing a substrate;

b) providing a readout circuit;
c) receiving incident IR energy using an IR energy sensor member; and
d) levitating said IR energy sensor member, said levitated sensor member having no physical or thermal contact while receiving IR energy, whereby said sensor member is proximately-spaced from said substrate and said readout circuit so as to avoid any physical contact with said substrate, said readout circuit, or any other structures, whereby the spacing provides an indirect electrical coupling between said sensor member and said readout circuit, whereby said readout circuit is capable of interrogating said sensor member; and wherein
said receiving incident IR energy step is carried out for a predetermined duration thereby providing an absorption period, said absorption period occurring at least in part while said sensor member is in said proximately-spaced position;
said method further includes interrogating said sensor member one or more times as said sensor member is indirectly electrically coupled thereby providing a post-absorption readout;
said method further includes periodically levitating said sensor member to a second position, whereby said sensor member makes physical contact with said readout circuit for a predetermined duration thereby providing a thermal quenching period, whereby heat dissipates from said sensor member by thermal conduction to said readout circuit and substrate.

32. The method of sensing according to claim 31, wherein:
levitating said sensor member to return to a proximately-spaced position from said substrate without making physical contact with said substrate, said readout circuit, or any other structures.

33. The method of sensing according to claim 32, whereby an indirect electrical coupling between said sensor member and said readout circuit is reestablished to enable said readout circuit to interrogate said sensor member, and further comprising the step of:
interrogating said sensor member one or more times after said quenching period while said sensor is in indirect electrical coupling providing a post-quench readout, whereby said post-quench readout can serve as baseline readout measurement for future cycles.

34. A method of sensing IR energy comprising the steps of:
a) providing a substrate;
b) providing a readout circuit;
c) receiving incident IR energy using an IR energy sensor member;
d) physically suspending said IR energy sensor member at a first position proximately-spaced from said substrate and said readout circuit; and
e) physically suspending said sensor member at a second position, periodically, whereby said sensor member is in direct electrical coupling contact with said readout circuit, whereby said readout circuit is capable of interrogating said sensor member.

35. The method of sensing IR energy according to claim 34, wherein
said receiving incident IR step is carried out for a predetermined duration thereby providing an absorption period, said absorption period occurring at least in part while said sensor member is in said proximately-spaced position.

36. The method of sensing IR energy according to claim 35, wherein said method further includes interrogating said sensor member one or more times as said sensor member is initially electrically coupled thereby providing a post-absorption readout.

37. The method of sensing IR energy according to claim 36, wherein:
said step for suspending said sensor member at second position is carried out for a predetermined duration thereby providing a thermal quenching period.

38. The method of sensing IR energy according to claim 37, whereby heat dissipates from said sensor member by thermal conduction to said readout circuit and substrate; and wherein:
said method further includes interrogating said readout circuit one or more times after said quenching period while said sensor member is in direct electrical coupling contact providing a post-quench readout, whereby said post-quench readout can serve as baseline readout measurement for future cycles.

39. A method of sensing IR energy comprising the steps of:
a) providing a substrate;
b) providing a readout circuit;
c) receiving incident IR energy using an IR energy sensor member; and
d) physically suspending said IR energy sensor member proximately-spaced from said substrate and said readout circuit, whereby the spacing provides an indirect electrical coupling between said sensor member and said readout circuit, whereby said readout circuit is capable of interrogating said sensor member; wherein:
said receiving incident IR energy step is carried out for a predetermined duration thereby providing an absorption period, said absorption period occurring at least in part while said sensor member is in said proximately-spaced position;
said method further includes interrogating said sensor member one or more times as said sensor member is indirectly electrically coupled thereby providing a post-absorption readout; and
said method further includes periodically suspending said sensor member to a second position, whereby said sensor member makes physical contact with said readout circuit for a predetermined duration thereby providing a thermal quenching period, whereby heat dissipates from said sensor member by thermal conduction to said readout circuit and substrate.

40. The method of sensing IR energy according to claim 39, further comprising:
suspending said sensor member to return to a proximately-spaced position from said substrate without making electrical contact with said readout circuit.

41. The method of sensing IR energy according to claim 40, whereby an indirect electrical coupling between said sensor member and said readout circuit is reestablished to enable said readout circuit to interrogate said sensor member, wherein said method further comprises:
interrogating said sensor member one or more times after said quenching period while said sensor is in indirect electrical coupling providing a post-quench readout, whereby said post-quench readout can serve as baseline readout measurement for future cycles.

* * * * *